US012787031B2

(12) United States Patent
Chen et al.

(10) Patent No.: US 12,787,031 B2
(45) Date of Patent: Nov. 3, 2026

(54) METHOD AND APPARATUS FOR INDICATING A SECOND-STAGE SIDELINK CONTROL INFORMATION FORMAT

(71) Applicant: Apogee 5G Global, LLC, Plano, TX (US)

(72) Inventors: Yu Chen, Shanghai (CN); Xiaobo Zhang, Shanghai (CN)

(73) Assignee: Apogee 5G Global, LLC, Plano, TX (US)

(*) Notice: Subject to any disclaimer, the term of this patent is extended or adjusted under 35 U.S.C. 154(b) by 627 days.

(21) Appl. No.: 18/198,289

(22) Filed: May 17, 2023

(65) Prior Publication Data

US 2023/0379941 A1 Nov. 23, 2023

(30) Foreign Application Priority Data

May 23, 2022 (CN) ......................... 202210562368.1

(51) Int. Cl.

| | |
|---|---|
| ***H04W 72/25*** | (2023.01) |
| ***H04L 1/00*** | (2006.01) |
| ***H04W 72/1263*** | (2023.01) |

(52) U.S. Cl.

CPC ........... *H04W 72/25* (2023.01); *H04L 1/0008* (2013.01); *H04W 72/1263* (2013.01)

(58) Field of Classification Search

CPC . H04W 72/25; H04W 72/1263; H04W 72/40; H04L 1/0008

See application file for complete search history.

(56) References Cited

U.S. PATENT DOCUMENTS

| | | | | |
|---|---|---|---|---|
| 11,032,867 | B2 | 6/2021 | Hahn | |
| 11,844,085 | B2 | 12/2023 | Fakoorian et al. | |
| 11,877,320 | B2 * | 1/2024 | Lee | H04L 1/1825 |

(Continued)

FOREIGN PATENT DOCUMENTS

| | | | | |
|---|---|---|---|---|
| CN | 112584480 A | * 3/2021 | | H04W 72/542 |
| CN | 113766645 A | * 12/2021 | | H04W 72/54 |

(Continued)

OTHER PUBLICATIONS

LG Electronics, "Draft CR—Correction on tables used for SCI format 1 in 36.213," 3GPP TSG-RAN1 Meeting #88bis, R1-1704819, Spokane, USA (Apr. 3-7, 2017).

(Continued)

*Primary Examiner* — Sujoy K Kundu
*Assistant Examiner* — Vladislav Y Agureyev
(74) *Attorney, Agent, or Firm* — Volpe Koenig

(57) ABSTRACT

The present application discloses a method and device for wireless communications, comprising receiving first Sidelink Control Information (SCI), a second SCI and a first Transport Block (TB) on sidelink; herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; the present application determines a format of a second SCI by transmitting the first bit group, which can better support new functions and technologies on sidelink.

20 Claims, 4 Drawing Sheets

(56) References Cited

U.S. PATENT DOCUMENTS

| | | | | |
|---|---|---|---|---|
| 12,041,584 | B2 * | 7/2024 | Ko | H04W 72/23 |
| 12,177,844 | B2 * | 12/2024 | Lee | H04L 1/0013 |
| 12,513,679 | B2 * | 12/2025 | Wang | H04W 72/0466 |
| 2018/0139599 | A1 * | 5/2018 | Yasukawa | H04W 8/005 |
| 2021/0067290 | A1 | 3/2021 | Chen et al. | |
| 2021/0160844 | A1 | 5/2021 | Lin et al. | |
| 2021/0168762 | A1 * | 6/2021 | Huang | H04B 7/0456 |
| 2022/0070869 | A1 * | 3/2022 | Wang | H04L 5/0044 |
| 2022/0124682 | A1 * | 4/2022 | Ko | H04W 72/02 |
| 2022/0201557 | A1 * | 6/2022 | Wang | H04W 72/0446 |
| 2022/0232627 | A1 * | 7/2022 | Lee | H04L 1/1825 |
| 2022/0272682 | A1 * | 8/2022 | Hahn | H04L 5/00 |
| 2022/0417917 | A1 * | 12/2022 | Fakoorian | H04W 4/023 |
| 2023/0024430 | A1 * | 1/2023 | Lee | H04L 1/0061 |
| 2023/0107528 | A1 * | 4/2023 | Liu | H04L 1/1848 370/329 |
| 2023/0137259 | A1 * | 5/2023 | Hwang | H04W 72/121 370/329 |
| 2023/0146547 | A1 * | 5/2023 | Zeng | H04W 72/25 |
| 2023/0156669 | A1 * | 5/2023 | Zhou | H04W 72/02 370/329 |
| 2023/0189294 | A1 * | 6/2023 | Dong | H04W 72/20 370/329 |
| 2023/0199838 | A1 * | 6/2023 | Lee | H04W 74/0808 370/329 |
| 2023/0209388 | A1 * | 6/2023 | Hwang | H04L 47/564 370/329 |
| 2023/0209576 | A1 * | 6/2023 | Hwang | H04W 8/26 370/329 |
| 2023/0217462 | A1 * | 7/2023 | Farag | H04W 72/25 370/329 |
| 2023/0247587 | A1 * | 8/2023 | Lee | H04W 72/02 370/329 |
| 2023/0300857 | A1 * | 9/2023 | Deng | H04W 72/11 370/329 |
| 2023/0309116 | A1 * | 9/2023 | Pan | H04W 72/1263 |
| 2024/0007230 | A1 * | 1/2024 | He | H04L 1/0061 |
| 2024/0057036 | A1 * | 2/2024 | Lee | H04W 72/25 |
| 2024/0155651 | A1 * | 5/2024 | Zhang | H04L 1/1812 |
| 2024/0195538 | A1 * | 6/2024 | Wu | H04L 1/1861 |
| 2024/0284413 | A1 * | 8/2024 | Wang | H04W 72/20 |
| 2024/0349247 | A1 * | 10/2024 | Wang | H04L 5/00 |
| 2024/0381332 | A1 * | 11/2024 | Zhang | H04W 72/20 |
| 2025/0056571 | A1 * | 2/2025 | Zhang | H04W 72/25 |
| 2025/0247859 | A1 * | 7/2025 | Hwang | H04W 74/0833 |

FOREIGN PATENT DOCUMENTS

| | | | | | |
|---|---|---|---|---|---|
| CN | 116097825 | A | * | 5/2023 | H04W 72/25 |
| CN | 116366208 | A | * | 6/2023 | H04L 1/1896 |
| EP | 4185032 | A1 | * | 5/2023 | H04L 1/1685 |
| EP | 4192049 | A1 | * | 6/2023 | H04W 72/20 |
| EP | 4192146 | A1 | * | 6/2023 | H04W 72/25 |
| EP | 4358613 | A1 | * | 4/2024 | H04L 1/1854 |
| EP | 4496408 | A1 | * | 1/2025 | G01S 5/0284 |
| KR | 20200050310 | A | | 5/2020 | |
| WO | WO-2021034045 | A1 | * | 2/2021 | H04W 72/20 |
| WO | WO-2022031822 | A1 | * | 2/2022 | H04L 5/0094 |
| WO | WO-2022199489 | A1 | * | 9/2022 | H04W 76/28 |

OTHER PUBLICATIONS

Third Generation Partnership Project, "Technical Specification Group Radio Access Network; NR; Multiplexing and channel coding (Release 17)," 3GPP TS 38.212 V17.1.0 (Mar. 2022).

* cited by examiner

METHOD AND APPARATUS FOR INDICATING A SECOND-STAGE SIDELINK CONTROL INFORMATION FORMAT

CROSS REFERENCE TO RELATED APPLICATIONS

This application claims the priority benefit of Chinese Patent Application No. 202210562368.1, filed on May 23, 2022, the full disclosure of which is incorporated herein by reference.

BACKGROUND

Technical Field

The present application relates to transmission methods and devices in wireless communication systems for improving service quality of traffic and supporting richer traffics, and in particular related to a method and device related to sidelink communications.

Related Art

Application scenarios of future wireless communication systems are becoming increasingly diversified, and different application scenarios have different performance demands on systems. In order to meet different performance requirements of various application scenarios, 3rd Generation Partner Project (3GPP) Radio Access Network (RAN) #72 plenary decided to conduct the study of New Radio (NR), or what is called fifth Generation (5G). The work Item (WI) of NR was approved at 3GPP RAN #75 plenary to standardize the NR.

In communications, whether Long Term Evolution (LTE) or 5G NR involves features of accurate reception of reliable information, optimized energy efficiency ratio, determination of information efficiency, flexible resource allocation, scalable system structure, efficient non-access layer information processing, low service interruption and dropping rate and support for low power consumption, which are of great significance to the maintenance of normal communications between a base station and a UE, reasonable scheduling of resources and balancing of system payload. Those features can be called the cornerstone of high throughout and are characterized in meeting communication requirements of various service, improving spectrum utilization and improving service quality, which are indispensable in enhanced Mobile BroadBand (eMBB), Ultra Reliable Low Latency Communications (URLLC) and enhanced Machine Type Communications (eMTC). Meanwhile, in the following communication modes, covering Industrial Internet of Things (IIoT), Vehicular to X (V2X), Device to Device communications, Unlicensed Spectrum communications, User communication quality monitoring, network planning optimization, Non-Territorial Networks (NTN), Territorial Networks (TN), and Dual connectivity system, there are extensive requirements in radio resource management and selection of multi-antenna codebooks as well as in signaling design, adjacent cell management, service management and beamforming. Transmission methods of information are divided into broadcast transmission and unicast transmission, both of which are essential for 5G system for that they are very helpful to meet the above requirements. The UE can be connected to the network directly or through a relay.

With the increase of scenarios and complexity of systems, higher requirements are raised for interruption rate and time delay reduction, reliability and system stability enhancement, service flexibility and power saving. At the same time, compatibility between different versions of different systems should be considered when designing the system.

SUMMARY

With the continuous evolution of sidelink communication systems, it has become an urgent need to support richer traffics and adopt more advanced technologies. However, these constantly increased features may affect the compatibility of the system. Many User Equipment (UE) in sidelink communications need to be able to recognize and receive the latest versions of signalings and messages to a certain extent for measurement and resource selection. That is to say, although a completely new signaling system can be defined to support the latest functions and technologies, it can lead to compatibility issues to legacy UE. However, the control information of the sidelink communication system, especially the control information of the physical layer, has very limited scalability and is difficult to support a large number of new technologies and functions, which is an urgent problem that needs to be solved in sidelink communications.

To address the above problem, the present application provides a solution.

It should be noted that if no conflict is incurred, embodiments in any node in the present application and the characteristics of the embodiments are also applicable to any other node, and vice versa. And the embodiments in the present application and the characteristics in the embodiments can be arbitrarily combined if there is no conflict.

The present application provides a method in a first node for wireless communications, comprising: receiving first Sidelink Control Information (SCI), a second SCI and a first Transport Block (TB) on sidelink;

herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, a problem to be solved in the present application comprises: how to enable the physical-layer control information of sidelink to support richer functions while ensuring compatibility.

In one embodiment, advantages of the above method comprise: it has good compatibility and can support new functions and technologies, such as supporting positioning, multi-carrier communications, multi-antenna communications, multi-connection, and broadcast and groupcast communications.

Specifically, according to one aspect of the present application, the first bit group belongs to the first SCI or the first bit group belongs to the second SCI.

Specifically, according to one aspect of the present application, the first bit group belongs to the first SCI;

herein, the meaning of the phrase that the first bit group is used to indicate the format of the second SCI is: the first bit group indicates the format of the second SCI from the first format subset; the first bit group belongs to at least one of a modulation-coding-related field or reserved field of the first SCI.

Specifically, according to one aspect of the present application, the first bit group belongs to the second SCI;

herein, the first format subset comprises at least two SCI formats, and numbers of bits comprised in all SCI formats in the first format subset are the same.

Specifically, according to one aspect of the present application, the first bit group belongs to the second SCI;

herein, a size of the first SCI format comprised in the first format subset is the same as a size of one of the SCI format 2-A, the SCI format 2-B or the SCI format 2-C; the SCI format 2-A and the SCI format 2-B do not comprise a padding bit field.

Specifically, according to one aspect of the present application, a first RRC message is received; the first RRC message is used to indicate a size of the first SCI format comprised in the first format subset.

Specifically, according to one aspect of the present application, at least partial bits in the first bit group belong to the first SCI; at least partial bits in the first bit group belong to the second SCI; the first bit group comprises at least two bits.

Specifically, according to one aspect of the present application, a bit belonging to the first SCI in the first bit group is used to indicate that a bit belonging to the second SCI in the first bit group is used to indicate the format of the second SCI.

Specifically, according to one aspect of the present application, a bit belonging to the first SCI in the first bit group is used to indicate a position of a bit belonging to the second SCI in the first bit group in the second SCI; a bit belonging to the second SCI in the first bit group is used to indicate the format of the second SCI.

Specifically, according to one aspect of the present application, the first node is an IoT terminal.

Specifically, according to one aspect of the present application, the first node is a relay.

Specifically, according to one aspect of the present application, the first node is a vehicle terminal.

Specifically, according to one aspect of the present application, the first node is an aircraft.

Specifically, according to one aspect of the present application, the first node is a mobile phone.

The present application provides a method in a second node for wireless communications, comprising:

transmitting a first SCI, a second SCI and a first TB on sidelink;

herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

Specifically, according to one aspect of the present application, the first bit group belongs to the first SCI or the first bit group belongs to the second SCI.

Specifically, according to one aspect of the present application, the first bit group belongs to the first SCI;

herein, the meaning of the phrase that the first bit group is used to indicate the format of the second SCI is: the first bit group indicates the format of the second SCI from the first format subset; the first bit group belongs to at least one of a modulation-coding-related field or reserved field of the first SCI.

Specifically, according to one aspect of the present application, the first bit group belongs to the second SCI;

herein, the first format subset comprises at least two SCI formats, and numbers of bits comprised in all SCI formats in the first format subset are the same.

Specifically, according to one aspect of the present application, the first bit group belongs to the second SCI;

herein, a size of the first SCI format comprised in the first format subset is the same as a size of one of the SCI format 2-A, the SCI format 2-B or the SCI format 2-C; the SCI format 2-A and the SCI format 2-B do not comprise a padding bit field.

Specifically, according to one aspect of the present application, a first RRC message is transmitted; the first RRC message is used to indicate a size of the first SCI format comprised in the first format subset.

Specifically, according to one aspect of the present application, at least partial bits in the first bit group belong to the first SCI; at least partial bits in the first bit group belong to the second SCI; the first bit group comprises at least two bits.

Specifically, according to one aspect of the present application, a bit belonging to the first SCI in the first bit group is used to indicate that a bit belonging to the second SCI in the first bit group is used to indicate the format of the second SCI.

Specifically, according to one aspect of the present application, a bit belonging to the first SCI in the first bit group is used to indicate a position of a bit belonging to the second SCI in the first bit group in the second SCI; a bit belonging to the second SCI in the first bit group is used to indicate the format of the second SCI.

Specifically, according to one aspect of the present application, the second node is a UE.

Specifically, according to one aspect of the present application, the second node is a relay.

Specifically, according to one aspect of the present application, the second node is a vehicle terminal.

Specifically, according to one aspect of the present application, the second node is an aircraft.

Specifically, according to one aspect of the present application, the second node is a satellite.

The present application provides a first node for wireless communications, comprising:

a first receiver, receiving first a SCI, a second SCI and a first TB on sidelink;

herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

The present application provides a second node for wireless communications, comprising:

a second transmitter, transmitting a first SCI, a second SCI and a first TB on sidelink;

herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the present application has the following advantages over conventional schemes:

a legacy UE can also receive and identify at least a first SCI, which is beneficial for measurement and resource selection of the legacy UE, further reducing interference, improving transmission efficiency, and ensuring fairness.

more advanced technologies of sidelink can be supported, such as multi-antenna and multi-carrier technologies, and it has good scalability at the same time.

no increase in overhead and complexity of the system, avoiding unnecessary blind decoding, and being beneficial for power saving.

supporting nodes in sidelink groups to locate each other.

BRIEF DESCRIPTION OF THE DRAWINGS

Other features, objects and advantages of the present application will become more apparent from the detailed description of non-restrictive embodiments taken in conjunction with the following drawings.

DESCRIPTION OF THE EMBODIMENTS

The technical scheme of the present application is described below in further details in conjunction with the drawings. It should be noted that the embodiments of the present application and the characteristics of the embodiments may be arbitrarily combined if no conflict is caused.

Embodiment 1

Figure 1:
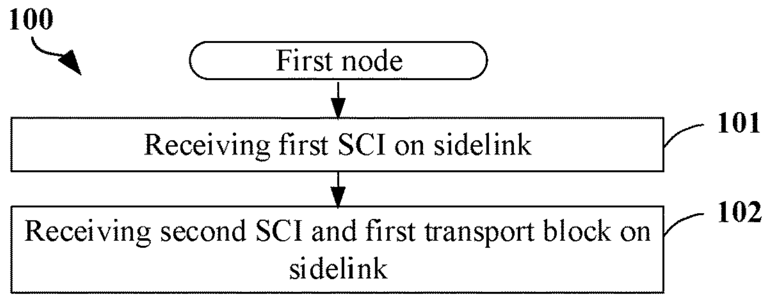
FIG. 1 illustrates a flowchart of receiving a first SCI, a second SCI and a first TB on sidelink according to one embodiment of the present application.

Embodiment 1 illustrates a flowchart of receiving a first SCI, a second SCI and a first TB on sidelink according to one embodiment of the present application, as shown in FIG. 1. In FIG. 1, each step represents a step, it should be particularly noted that the sequence order of each box herein does not imply a chronological order of steps marked respectively by these boxes.

In Embodiment 1, a first node in the present application receives a first SCI on sidelink in step 101; receives a second SCI and a first TB on sidelink in step 102;

herein, the first SCI, a second SCI, and a first TB are all received on sidelink, the first SCI schedules a first PSSCH, and the second SCI and first TB are both transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the first node is User Equipment (UE).

In one embodiment, the first node is in RRC_CONNECTED state compared with a serving cell.

In one embodiment, the first node is in RRC_IDLE state compared with a serving cell.

In one embodiment, the first node is in RRC_INACTIVE state compared with a serving cell.

In one embodiment, the first node is located within the network coverage.

In one embodiment, the first node is located outside the network coverage.

In one embodiment, a transmitter of the first SCI is located within the network coverage.

In one embodiment, a transmitter of the first SCI is located outside the network coverage.

In one embodiment, the sidelink in the present application refers to a link between a UE and a UE.

In one embodiment, the sidelink in the present application refers to a radio link between a UE and a UE.

In one embodiment, the sidelink in the present application refers to a link not between a UE and network.

In one embodiment, the sidelink in the present application refers to a link not between a UE and a base station.

In one embodiment, the concept of uplink and downlink does not exist in the sidelink of the present application.

In one embodiment, transmitting on sidelink refers to using resources of sidelink for a transmission, and the transmitted information uses a sidelink physical channel.

In one subembodiment of the embodiment, the sidelink physical channel comprises a physical sidelink shared channel (PSSCH) and/or a physical sidelink control channel (PSCCH).

In one subembodiment of the embodiment, a potential receiver of the behavior of transmitting on sidelink is other UEs instead of a base station or a cell.

In one subembodiment of the embodiment, a transmitter corresponding to the behavior of transmitting on sidelink is a UE.

In one embodiment, the behavior of receiving on sidelink refers to receiving on sidelink resources, and the received information uses a sidelink physical channel.

In one subembodiment of the embodiment, the sidelink physical channel comprises a physical sidelink shared channel (PSSCH) and/or a physical sidelink control channel (PSCCH).

In one subembodiment of the embodiment, a potential receiver of the behavior of receiving on sidelink is other UEs instead of a base station or a cell.

In one subembodiment of the embodiment, a transmitter corresponding to the behavior of receiving on sidelink is a UE.

In one embodiment, an SCI occupies a sidelink physical channel PSCCH.

In one embodiment, an SCI occupies a sidelink physical channel PSSCH.

In one embodiment, in sidelink communications, a physical sidelink control channel (PSCCH) is only used to transmit control information.

In one embodiment, in sidelink communications, data is only transmitted on a PSSCH.

In one embodiment, both the PSSCH and the PSCCH are channels of physical layer.

In one embodiment, the first PSSCH is a PSSCH.

In one embodiment, the first SCI is transmitted on a PSSCH.

In one embodiment, the first SCI and the second SCI and the first TB occupy a same resource pool.

In one embodiment, the first SCI and the second SCI and the first TB occupy same frequency-domain resources.

In one embodiment, the first SCI, the second SCI and the first TB occupy different frequency-domain resources.

In one embodiment, the first SCI is a $1^{st}$-stage SCI.

In one embodiment, the second SCI is a $2^{nd}$-stage SCI.

In one embodiment, a reception of the first SCI is earlier than the second SCI.

In one embodiment, a reception of the first SCI is not earlier than the second SCI.

In one embodiment, a format of the first SCI is 1-A.

In one embodiment, the first SCI schedules the second SCI.

In one embodiment, the meaning of the phrase that the first SCI schedules the second SCI comprises: the first SCI indicates an SCI format of the second SCI.

In one embodiment, the meaning of the phrase of the first SCI schedules a first PSSCH comprises: the first SCI indicates resources of the first PSSCH.

In one subembodiment of the embodiment, the resources of the first PSSCH comprises time-domain resources.

In one subembodiment of the embodiment, the resources of the first PSSCH comprises frequency-domain resources.

In one subembodiment of the embodiment, the first SCI indicates a resource reservation period.

In one subembodiment of the embodiment, the resources of the first PSSCH comprises spatial resources.

In one embodiment, the meaning of the phrase that the first SCI schedules a first PSSCH comprises: the first SCI indicates a parameter used to receive the first PSSCH.

In one subembodiment of the embodiment, the parameter used to receive the first PSSCH comprises a DeModulation reference signal (DMRS) module.

In one subembodiment of the embodiment, the parameter used to receive the first PSSCH comprises a DMRS port.

In one subembodiment of the embodiment, the parameter used to receive the first PSSCH comprises a modulation coding method.

In one subembodiment of the embodiment, the parameter used to receive the first PSSCH comprises a conflict information receiver flag.

In one embodiment, the meaning of the phrase that both the second SCI and the first TB are transmitted in the first PSSCH comprises: both the second SCI and the first TB occupy resources of a PSSCH.

In one embodiment, the meaning of the phrase that both the second SCI and the first TB are transmitted in the first PSSCH comprises: both the second SCI and the first TB are transmitted through a PSSCH.

In one embodiment, the meaning of the phrase that both the second SCI and the first TB are transmitted in the first PSSCH comprises: a physical channel occupied by the second SCI and the first TB is a PSSCH.

In one embodiment, the meaning of the phrase that both the second SCI and the first TB are transmitted in the first PSSCH comprises: a PSSCH carries the second SCI and the first TB.

In one embodiment, the first TB comprises at least one bit.

In one embodiment, the first TB comprises a reference signal.

In one embodiment, the first TB comprises a reference signal used for positioning.

In one embodiment, the first TB comprises a TB.

In one embodiment, the first TB comprises a MAC PDU.

In one embodiment, the first TB is used to bear broadcast traffic.

In one embodiment, the first TB is used to bear groupcast traffic.

In one embodiment, the first TB is used to bear unicast traffic.

In one embodiment, the first TB is used to bear relay traffic.

In one embodiment, the first TB is used to bear positioning information.

In one embodiment, the first TB is used to carry information related to Internet of Vehicles (IoV).

In one embodiment, the first TB is used to carry information related to security.

In one embodiment, the first TB is used to carry emergency services.

In one embodiment, the meaning of the phrase that candidates of a format of the second SCI comprise SCI format 2-A, SCI format 2-B, SCI format 2-C and a first format subset is: a format of the second SCI is one of SCI format 2-A, SCI format 2-B, SCI format 2-C and a first format subset.

In one embodiment, the format of the second SCI corresponds to a field comprised in the second SCI.

In one embodiment, the second SCI is used to receive the first TB.

In one embodiment, the second SCI is used to decode the first TB.

In one embodiment, the first format subset comprises an SCI format.

In one embodiment, the first format subset comprises at least two SCI formats.

In one embodiment, the first format subset comprises SCI format 2-D.

In one embodiment, the first format subset comprises SCI format 2-E.

In one embodiment, the first format subset comprises SCI format 2-F.

In one embodiment, the first format subset comprises SCI format 3-A.

In one embodiment, the first format subset comprises SCI format 3-B.

In one embodiment, the first format subset comprises SCI format 3-C.

In one embodiment, the first format subset comprises SCI format 2-A.1 or 2-A-1.

In one embodiment, the first format subset comprises SCI format 2-B.1 or 2-B-1.

In one embodiment, the first format subset comprises SCI format 2-C.1 or 2-C-1.

In one embodiment, the first format subset comprises SCI format 2-D.1 or 2-D-1.

In one embodiment, a candidate of the format of the second SCI has a specific size.

In one embodiment, sizes of different candidates of the format of the second SCI are different.

In one embodiment, fields comprised in different candidates of the format of the second SCI are different.

In one embodiment, the format of the second SCI is an SCI format.

In one embodiment, the first SCI format is any SCI format in the first format subset.

In one embodiment, the first SCI format is an SCI format related to positioning in the first format subset.

In one embodiment, the first SCI format is an SCI format related to carrier aggregation in the first format subset.

In one embodiment, the first SCI format is an SCI format related to high-frequency communications in the first format subset.

In one embodiment, the first SCI format is an SCI format related to FR2 in the first format subset.

In one embodiment, the first SCI format is an SCI format related to NTN in the first format subset.

In one embodiment, the first SCI format is an SCI format related to small data transmission in the first format subset.

In one embodiment, the first SCI format is an SCI format related to multi-antenna in the first format subset.

In one embodiment, the first SCI format is an SCI format related to beam in the first format subset.

In one embodiment, the first SCI format is an SCI format related to MIMO in the first format subset.

In one embodiment, the first SCI format is not a format of the first SCI, but an SCI format of the second SCI.

In one embodiment, the first SCI comprises a $2^{nd}$-stage SCI format field.

In one embodiment, a size of the $2^{nd}$-stage SCI format field comprised in the first SCI are 2 bits.

In one embodiment, the first bit group indicates a size of the $2^{nd}$-stage SCI format field comprised in the first SCI.

In one embodiment, the first bit group indicates whether the $2^{nd}$-stage SCI format field comprised in the first SCI comprises an extended bit.

In one embodiment, possible values of the $2^{nd}$-stage SCI format field comprised in the first SCI comprise 00,01,10,11.

In one embodiment, when the value of the $2^{nd}$-stage SCI format field comprised in the first SCI is 00, the format of the second SCI is an SCI format 2-A.

In one embodiment, when the value of the $2^{nd}$-stage SCI format field comprised in the first SCI is 01, the format of the second SCI is an SCI format 2-B.

In one embodiment, when the value of the $2^{nd}$-stage SCI format field comprised in the first SCI is 10, the format of the second SCI is an SCI format 2-C.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate an MCS.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate a Redundancy Version (RV).

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to reserve bits.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate a Beta offset.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate a DMRS.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate PSFCH overhead.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate a conflict information receiver flag.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate a resource reservation time.

In one embodiment, the meaning of the phrase that when the value of the $2^{nd}$-stage SCI format field in the first SCI is one of 00, 01 and 10, the first bit group is not used to indicate the format of the second SCI comprises: the value of the $2^{nd}$-stage SCI format field in the first SCI is one of 00, 01 and 10, the purpose of the first bit group is to indicate priority.

In one embodiment, the meaning of the phrase that the first bit group is used to indicate the format of the second SCI comprises: the first bit group indicates which SCI format in the first format subset that the format of the second SCI is.

In one embodiment, the meaning of the phrase that the first bit group is used to indicate the format of the second SCI comprises: the first bit group indicates whether the format of the second SCI belongs to a first subset of the first format subset; the first subset of the first format subset is a true subset of the first format subset.

In one embodiment, the meaning of the phrase that the first bit group is used to indicate the format of the second SCI comprises: the first bit group indicates a size of the second SCI.

In one embodiment, the meaning of the phrase that the first bit group is used to indicate the format of the second SCI comprises: the first bit group indicates whether an enhanced SCI format is supported.

In one embodiment, the meaning of the phrase that the first bit group is used to indicate the format of the second SCI comprises: the first bit group indicates whether an extended SCI format is supported.

In one embodiment, a size of the first bit group is 1 bit.

In one embodiment, a size of the first bit group are 2 bits.

In one embodiment, a size of the first bit group are 3 bits.

In one embodiment, a size of the first bit group are 4 bits.

In one embodiment, the first bit group belongs to the first SCI.

In one embodiment, the first bit group belongs to the second SCI.

In one embodiment, the first bit group is scrambling of the first SCI.

In one embodiment, the first bit group belongs to a CRC of the first SCI.

In one embodiment, the first bit group is an index or an identity of a resource pool occupied by the first SCI.

In one embodiment, the first bit group belongs to the first SCI or the first bit group belongs to the second SCI.

In one subembodiment of the above embodiment, the first bit group belongs to a field of the first SCI.

In one subembodiment of the above embodiment, the first bit group belongs to at least two fields of the first SCI.

In one subembodiment of the above embodiment, the first bit group depends on re-interpreting of at least one field of the first SCI.

In one subembodiment of the above embodiment, the first bit group belongs to a field of the second SCI.

In one subembodiment of the above embodiment, the first bit group belongs to at least two fields of the second SCI.

In one subembodiment of the above embodiment, the first bit group depends on re-interpreting of at least one field of the second SCI.

In one embodiment, the first bit group comprises K bit(s), and the first bit group is K continuous bit(s) in the first SCI, K being a positive integer.

In one embodiment, the first bit group comprises K bit(s), and the first bit group is K continuous bit(s) in the second SCI, K being a positive integer.

In one embodiment, the first bit group belongs to the first SCI.

In one embodiment, the meaning of the phrase that the first bit group is used to indicate the format of the second SCI is: the first bit group indicates the format of the second SCI from the first format subset.

In one subembodiment of the above embodiment, the first bit group comprises an index of an SCI format in the first format subset.

In one embodiment, the first bit group belongs to at least one of a modulation-coding-related field or reserved field of the first SCI.

In one embodiment, the first bit group belongs to the second SCI.

In one embodiment, the first format subset does not comprise SCI format 2-A.

In one embodiment, the first format subset does not comprise SCI format 2-B.

In one embodiment, the first format subset does not comprise SCI format 2-C.

In one embodiment, the first format subset comprises at least two SCI formats, and numbers of bits comprised in all SCI formats in the first format subset are the same.

In one subembodiment of the above embodiment, the first format subset comprises 3 SCI formats.

In one subembodiment of the above embodiment, the first format subset comprises 4 SCI formats.

In one subembodiment of the above embodiment, at least one SCI format in the first format subset comprises a padding bit.

In one subembodiment of the above embodiment, only one SCI format in the first format subset does not comprise a padding bit.

In one subembodiment of the above embodiment, the format of the second SCI belongs to the first format subset, the second SCI comprises A information bit(s), the A information bit(s) is(are respectively) $a_0, a_1, a_2, \ldots, a_{A-1}$, the second SCI comprises a 2A-th field and a 2B-th field, and the 2A-th field is used to indicate a source and comprises 8 bits of a first identity; the 2B-th field is used to indicate a destination and comprises 16 bits of a second identity, and the first identity and the second identity are respectively link-layer identities; the 2A-th field is mapped to $a_7$ to $a_{14}$ of the A information bit(s), and the 2B-th field is mapped to $a_{15}$ to $a_{30}$ of the A information bit(s).

In one subembodiment of the above embodiment, the format of the second SCI belongs to the first format subset, the second SCI comprises A information bit(s) and L CRC bit(s), the A information bit(s) is(are respectively) $a_0, a_1, a_2, \ldots, a_{A-1}$, and the L CRC bit(s) is(are) generated by the A information bit(s); the second SCI comprises a 2A-th field and a 2B-th field, and the 2A-th field is used to indicate a source and comprises 8 bits of a first identity; the 2B-th field is used to indicate a destination and comprises 16 bits of a second identity, and the first identity and the second identity are respectively link-layer identities; the 2A-th field is mapped to $a_7$ to $a_{14}$ of the A information bit(s), and the 2B-th field is mapped to $a_{15}$ to $a_{30}$ of the A information bit(s).

In one subembodiment of the above embodiment, the first identity is a Layer-2 ID of a transmitter of the second SCI.

In one subembodiment of the above embodiment, the second ID is a Layer-2 ID of the first node.

In one subembodiment of the above embodiment, the second ID is a Layer-2 ID of a group where the first node is located.

In one subembodiment of the above embodiment, the second identity is a layer-2 ID of a group.

In one subembodiment of the above embodiment, the format of the second SCI belongs to the first format subset, and the second SCI comprises a 4-bit HARQ process number field, which maps to $a_0$, $a_1$, $a_2$, $a_3$ of the A information bit(s).

In one subembodiment of the above embodiment, the format of the second SCI belongs to the first format subset, the second SCI comprises a 1-bit new data indicator field, which maps to $a_4$ of the A information bit(s).

In one subembodiment of the above embodiment, the format of the second SCI belongs to the first format subset, the second SCI comprises a 2-bit Redundancy version field, which maps to $a_5$ and $a_6$ of the A information bit(s).

In one embodiment, advantage of the above method is: even a legacy terminal that does not recognize a latest SCI format can determine a link layer identity and basic information such as HARQ procedure from fixed positions of these new formats, the positions of these information are the same as positions of corresponding fields comprised in a format that the legacy terminal can interpret, which is conducive to measurement, resource occupation, and monitoring by the legacy terminal, and is conducive to system fairness and reducing interference.

In one embodiment, advantage of the above method is: formats in a first format subset should be as same as possible to avoid blind decoding.

In one embodiment, the meaning of the phrase that a number of bit(s) comprised in all SCI formats in the first format subset comprises: sizes of all SCI formats in the first format subset are the same.

In one embodiment, the first bit group belongs to the second SCI;

herein, a size of the first SCI format comprised in the first format subset is the same as a size of one of the SCI format 2-A, the SCI format 2-B or the SCI format 2-C; the SCI format 2-A and the SCI format 2-B do not comprise a padding bit field.

In one subembodiment of the above embodiment, the first SCI format comprises a padding bit field.

In one embodiment, at least partial bits in the first bit group belong to the first SCI; at least partial bits in the first bit group belong to the second SCI; the first bit group comprises at least two bits.

In one subembodiment of the above embodiment, a bit in the first bit group belongs to the first SCI, and the other bits belong to the second SCI.

In one subembodiment of the above embodiment, a bit belonging to the first SCI in the first bit group is used to indicate whether there exists a bit belonging to the second SCI in the first bit group.

In one subembodiment of the above embodiment, a size of the first bit group is 2 bits, a bit in the first bit group belongs to the first SCI, and the other bit in the first bit group belongs to the second SCI.

In one embodiment, a bit belonging to the first SCI in the first bit group is used to indicate that a bit belonging to the second SCI in the first bit group is used to indicate the format of the second SCI.

In one subembodiment of the above embodiment, a bit belonging to the first SCI in the first bit group is used to indicate a number of bit(s) belonging to the second SCI in the first bit group.

In one embodiment, a bit belonging to the first SCI in the first bit group is used to indicate whether there exists a bit belonging to the second SCI in the first bit group.

In one embodiment, a bit belonging to the first SCI in the first bit group is used to indicate whether an enhanced SCI format 2-D is used.

In one embodiment, a bit belonging to the first SCI in the first bit group is used to indicate a position of a bit belonging to the second SCI in the first bit group in the second SCI; a bit belonging to the second SCI in the first bit group is used to indicate the format of the second SCI.

In one subembodiment of the above embodiment, the position of a bit belonging to the second SCI in the first bit group is one of limited number of candidate position(s).

In one embodiment, advantages of the above method comprise: a first SCI only comprises a bit in a first bit group, which helps to reduce the impact of a new enhanced SCI format on a first SCI and has better compatibility with legacy UE.

In one embodiment, the SCI format 2-A indicates whether to broadcast groupcast or unicast.

In one embodiment, the SCI format 2-B indicates a region identity.

In one embodiment, the SCI format 2-C indicates whether to provide information or request information.

In one embodiment, the format of the second SCI belongs to the first format subset, and the second SCI is used for positioning.

In one subembodiment of the embodiment, the second SCI comprises a reference signal related to positioning.

In one subembodiment of the embodiment, the second SCI comprises a format of a reference signal related to positioning.

In one subembodiment of the embodiment, the second SCI comprises a parameter of a reference signal related to positioning.

In one subembodiment of the embodiment, the second SCI comprises a root of a reference signal related to positioning.

In one subembodiment of the embodiment, the second SCI comprises an index of a reference signal related to positioning.

In one subembodiment of the embodiment, the second SCI comprises a transmission window or a transmission period of a reference signal related to positioning.

In one subembodiment of the embodiment, the second SCI comprises a bandwidth and/or a resource pool occupied by a reference signal related to positioning.

In one subembodiment of the embodiment, the second SCI comprises position information of the first node.

In one subembodiment of the embodiment, the second SCI comprises angle information of a transmitter of the first SCI.

In one subembodiment of the embodiment, the second SCI comprises high precision position information of a transmitter of the first SCI.

In one subembodiment of the embodiment, the second SCI comprises positioning accuracy.

In one subembodiment of the embodiment, the second SCI comprises timing accuracy.

In one subembodiment of the embodiment, the second SCI comprises integrity of positioning.

In one embodiment, the format of the second SCI belongs to the first format subset, and the second SCI is used for carrier aggregation.

In one subembodiment of the embodiment, the second SCI indicates a number of carrier(s).

In one subembodiment of the embodiment, the second SCI indicates a carrier aggregation parameter.

In one subembodiment of the embodiment, the second SCI indicates an antenna port of a carrier.

In one subembodiment of the embodiment, the second SCI indicates a correlation relation of multiple carriers.

In one subembodiment of the embodiment, the second SCI indicates a co-located relation of carrier(s).

In one subembodiment of the embodiment, the second SCI indicates a reference signal of a multi-carrier.

In one subembodiment of the embodiment, the second SCI indicates a HARQ procedure corresponding to multiple carriers.

In one subembodiment of the embodiment, the second SCI indicates an activation of a carrier.

In one subembodiment of the embodiment, the second SCI indicates a de-activation of a carrier.

In one subembodiment of the embodiment, the second SCI indicates a PSSCH scheduled by each carrier.

In one embodiment, in a multicarrier system, a carrier corresponds to a sub-cell.

In one embodiment, in a multicarrier system, a carrier is a sub-cell.

In one embodiment, the format of the second SCI belongs to the first format subset, and the second SCI is used for multi-antenna.

In one subembodiment of the embodiment, the multi-antenna comprises MIMO.

In one subembodiment of the embodiment, the multi-antenna comprises multiple beams.

In one subembodiment of the embodiment, the second SCI is used to indicate a spatial parameter.

In one subembodiment of the embodiment, the second SCI is used to indicate a Transmission Configuration Indication (TCI).

In one subembodiment of the embodiment, the second SCI is used to indicate a sidelink TCI.

In one subembodiment of the embodiment, the second SCI is used to indicate an index of a beam.

In one subembodiment of the embodiment, the second SCI is used to indicate a co-located relation.

In one subembodiment of the embodiment, the second SCI is used to indicate a co-located relation of a spatial reference signal.

In one embodiment, the first SCI format comprised in the first format subset comprises a padding bit field.

In one embodiment, all SCI formats comprised in the first format subset comprises a padding bit field.

In one embodiment, only one of all SCI formats comprised in the first format subset does not comprise a padding bit field.

In one embodiment, at least one of all SCI formats comprised in the first format subset comprises a padding bit field.

Embodiment 2

Figure 2:
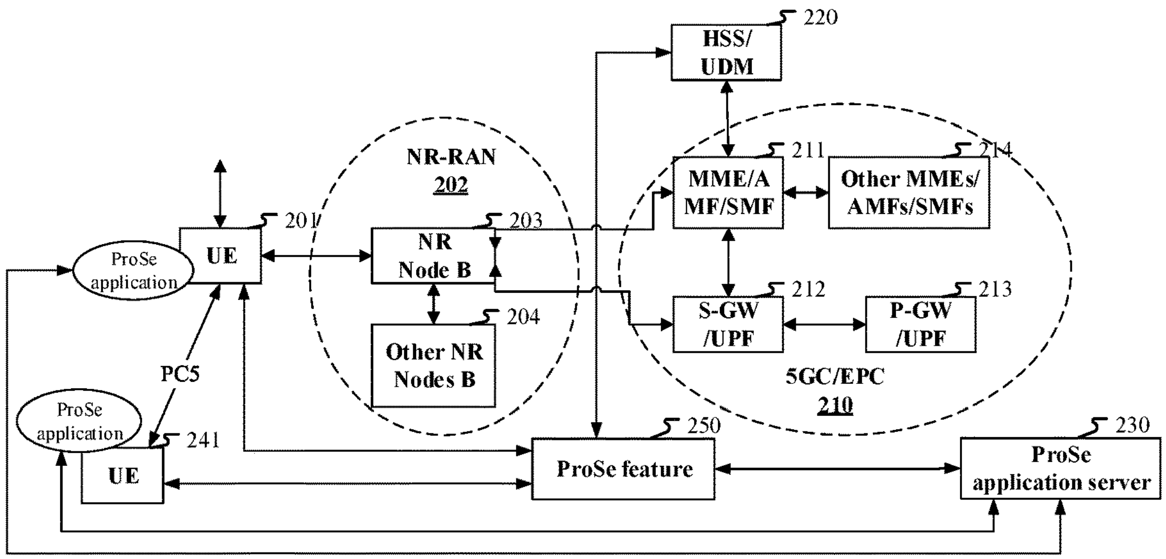
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The 5G NR or LTE network architecture 200 may be called a 5G System (5GS)/Evolved Packet System (EPS) 200 or other appropriate terms. The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPS), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS). To support positioning services, network elements or functional nodes related to positioning services can also be comprised in the network, such as Location Management Function (LMF). LMF can be a logical unit or exist in a physical entity. LMF can be a positioning server, for example, LMF can belong to 211 or 214 in FIG. 2. LMF and AMF can have a communication interface, such as NL1 interface, and a UE can communicate with LMF through AMF.

In one embodiment, the first node in the present application is a UE 201.

In one embodiment, the second node in the present application is a UE 201.

In one embodiment, a radio link between the UE 201 and NR node B is uplink.

In one embodiment, a radio link between NR node B and UE 201 is downlink.

In one embodiment, the UE 201 supports relay transmission.

In one embodiment, the UE 201 comprises a mobile phone.

In one embodiment, the UE 201 is a vehicle comprising a car.

In one embodiment, the UE 201 supports sidelink transmission.

In one embodiment, the UE 201 supports MBS transmission.

In one embodiment, the UE 241 supports relay transmission.

In one embodiment, the UE 241 comprises a mobile phone.

In one embodiment, the UE 241 is a vehicle comprising a car.

In one embodiment, the UE 241 supports sidelink transmission.

In one embodiment, the UE 241 supports MBS transmission.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a flight platform.

In one embodiment, the gNB 203 is satellite.

Embodiment 3

Figure 3:
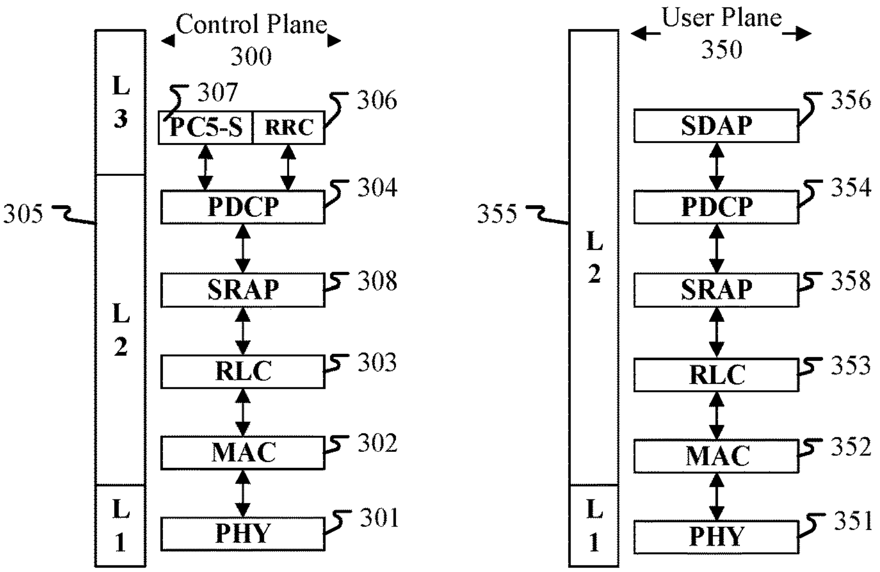
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first node (UE, gNB or a satellite or an aircraft in NTN) and a second node (gNB, UE or a satellite or an aircraft in NTN), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first node and a second node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node. The PDCP sublayer 304 provides multiplexing among variable radio bearers and logical channels. The PDCP sublayer 304 provides security by encrypting a packet and provides support for a first node handover between second nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second node and a first node. PC5 Signaling Protocol (PC5-S) sublayer 307 is responsible for the processing of signaling protocol at PC5 interface. The radio protocol architecture of the user plane 350 comprises layer 1 (L1) and layer 2 (L2). In the user plane 350, the radio protocol architecture for the first node and the second node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. SRB can be seen as a service or interface provided by the PDCP layer to a higher layer, such as the RRC layer. In NR system, SRB comprises SRB1, SRB2, SRB3, and when it comes to sidelink communications, SRB4 is also comprised, which are respectively used to transmit different types of control signalings. SRB, a bearer between a UE and access network, is used to transmit a control signaling, comprising an RRC signaling, between UE and access network. SRB1 has special significance for a UE. After each UE establishes an RRC connection, there will be SRB1 used to transmit RRC signaling. Most of the signalings are transmitted through SRB1. If SRB1 is interrupted or unavailable, the UE must perform RRC reconstruction. SRB2 is generally used only to transmit an NAS signaling or signaling related to security aspects. UE cannot configure SRB3. Except for emergency services, a UE must establish an RRC connection with the network for subsequent communications. Although not described in the figure, the first node may comprise several higher layers above the L2 305. also comprises a network layer (i.e., IP layer) terminated at a P-GW 213 of the network side and an application layer terminated at the other side of the connection (i.e., a peer UE, a server, etc.). For UE involving relay service, its control plane can also comprise the adaptation sub-layer Sidelink Relay Adaptation Protocol (SRAP) 308, and its user plane can also comprise the adaptation sub-layer SRAP358, the introduction of the adaptation layer helps lower layers, such as MAC layer, RLC layer, to multiplex and/or distinguish data from multiple source UEs. For nodes not involving relay communications, the communication procedure does not require PC5-S307, SRAP308, SRAP358. Sidelink RRC, that is, a peer RRC entity of an RRC entity of a UE is within another UE, can also be an RRC of a PC5 interface or a PC5-RRC.

In one embodiment, the radio protocol architecture in FIG. 3 is applicable to the first node in the present application.

In one embodiment, the radio protocol architecture in FIG. 3 is applicable to the second node in the present application.

In one embodiment, the first SCI in the present application is generated by the PHY 301.

In one embodiment, the second SCI in the present application is generated by the PHY 301.

In one embodiment, the first TB in the present application is generated by the PHY 351 or the MAC 352.

In one embodiment, the first RRC message in the present application is generated by the RRC 305.

Embodiment 4

Figure 4:
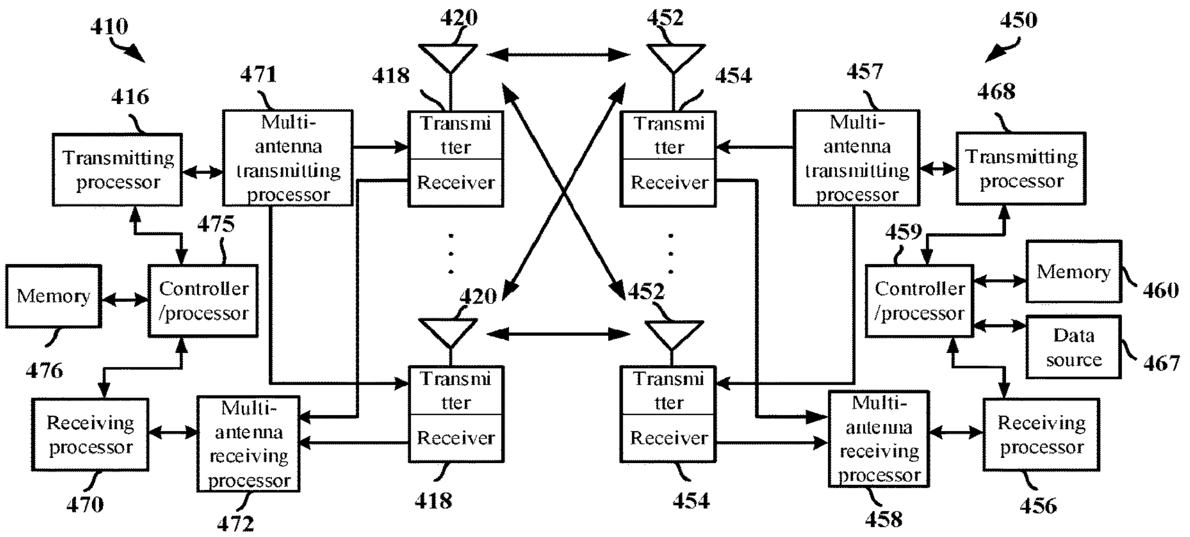
FIG. 4 illustrates a schematic diagram of a first communication device and a second communication device according to one embodiment of the present application.

Embodiment 4 illustrates a schematic diagram of a first communication device and a second communication device according to one embodiment of the present application, as shown in FIG. 4. FIG. 4 is a block diagram of a first communication device 450 in communication with a second communication device 410 in an access network.

The first communication device 450 comprises a controller/processor 459, a memory 460, a data source 467, a transmitting processor 468, a receiving processor 456, optionally may also comprise a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, optional can also comprise a multi-antenna receiving processor 472, a multi-antenna transmitting processor 471, a transmitter/receiver 418 and an antenna 420.

In a transmission from the second communication device 410 to the first communication device 450, at the first communication device 410, a higher layer packet from the core network is provided to a controller/processor 475. The controller/processor 475 provides a function of the L2 layer. In the transmission from the second communication device 410 to the first communication device 450, the controller/processor 475 provides header compression, encryption, packet segmentation and reordering, and multiplexing between a logical channel and a transport channel, and radio resources allocation for the first communication device 450 based on various priorities. The controller/processor 475 is also responsible for retransmission of a lost packet and a signaling to the first communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 410, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the second communication device 410 to the first communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the first communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the second communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the second communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the first communication device 450 to the second communication device 410, at the second communication device 450, the data source 467 is configured to provide a higher-layer packet to the controller/processor 459. The data source 467 represents all protocol layers above the L2 layer. Similar to a transmitting function of the second communication device 410 described in the transmission from the second communication device 410 to the first communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the second communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the first communication device 450 to the second communication device 410, the function at the second communication device 410 is similar to the receiving function at the first communication device 450 described in the transmission from the second communication device 410 to the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the first communication device 450 to the second communication device 410, the controller/processor 475 provides demultiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first communication device 450 comprises: at least one processor and at least one memory. The at least one memory comprises computer program codes; the at least one memory and the computer program codes are configured to be used in collaboration with the at least one processor, the first communication device 450 at least: receives a first SCI, a second SCI and a first TB on sidelink; herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the first communication device 450 comprises at least one processor and at least one memory. a memory that stores a computer readable instruction program. The computer readable instruction program generates an action when executed by at least one processor. The action includes: receiving a first SCI, a second SCI and a first TB on sidelink; herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the second communication device 410 comprises at least one processor and at least one memory. The at least one memory comprises computer program codes; the at least one memory and the computer program codes are configured to be used in collaboration with the at least one processor, the second communication device 410 at least: transmits a first SCI, a second SCI and a first TB on sidelink; herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the second communication device 410 comprises a memory that stores a computer readable instruction program. The computer readable instruction program generates an action when executed by at least one processor. The action includes: transmitting a first SCI, a second SCI and a first TB on sidelink; herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the first communication device 450 corresponds to a first node in the present application.

In one embodiment, the second communication device 410 corresponds to a second node in the present application.

In one embodiment, the first communication device 450 is a UE.

In one embodiment, the first communication device 450 is a vehicle terminal.

In one embodiment, the second communication device 450 is a relay.

In one embodiment, the second communication device 410 is a satellite.

In one embodiment, the second communication device 410 is an aircraft.

In one embodiment, the first communication device 410 is a UE.

In one embodiment, the first communication device 410 is a relay.

In one embodiment, the receiver 454 (comprising the antenna 452), the receiving processor 456 and the controller/processor 459 are used to receive the first SCI in the present application.

In one embodiment, the receiver 454 (comprising the antenna 452), the receiving processor 456 and the controller/processor 459 are used to receive the second SCI in the present application.

In one embodiment, the receiver 454 (comprising the antenna 452), the receiving processor 456 and the controller/processor 459 are used to receive the first TB in the present application.

In one embodiment, the receiver 454 (comprising the antenna 452), the receiving processor 456 and the controller/processor 459 are used to receive the first RRC message in the present application.

In one embodiment, the transmitter 418 (comprising the antenna 420), the transmitting processor 416 and the controller/processor 475 are used to transmit the first SCI in the present application.

In one embodiment, the transmitter 418 (comprising the antenna 420), the transmitting processor 416 and the controller/processor 475 are used to transmit the second SCI in the present application.

In one embodiment, the transmitter 418 (comprising the antenna 420), the transmitting processor 416 and the controller/processor 475 are used to transmit the first TB in the present application.

In one embodiment, the transmitter 418 (comprising the antenna 420), the transmitting processor 416 and the controller/processor 475 are used to transmit the first RRC message in the present application.

Embodiment 5

Figure 5:
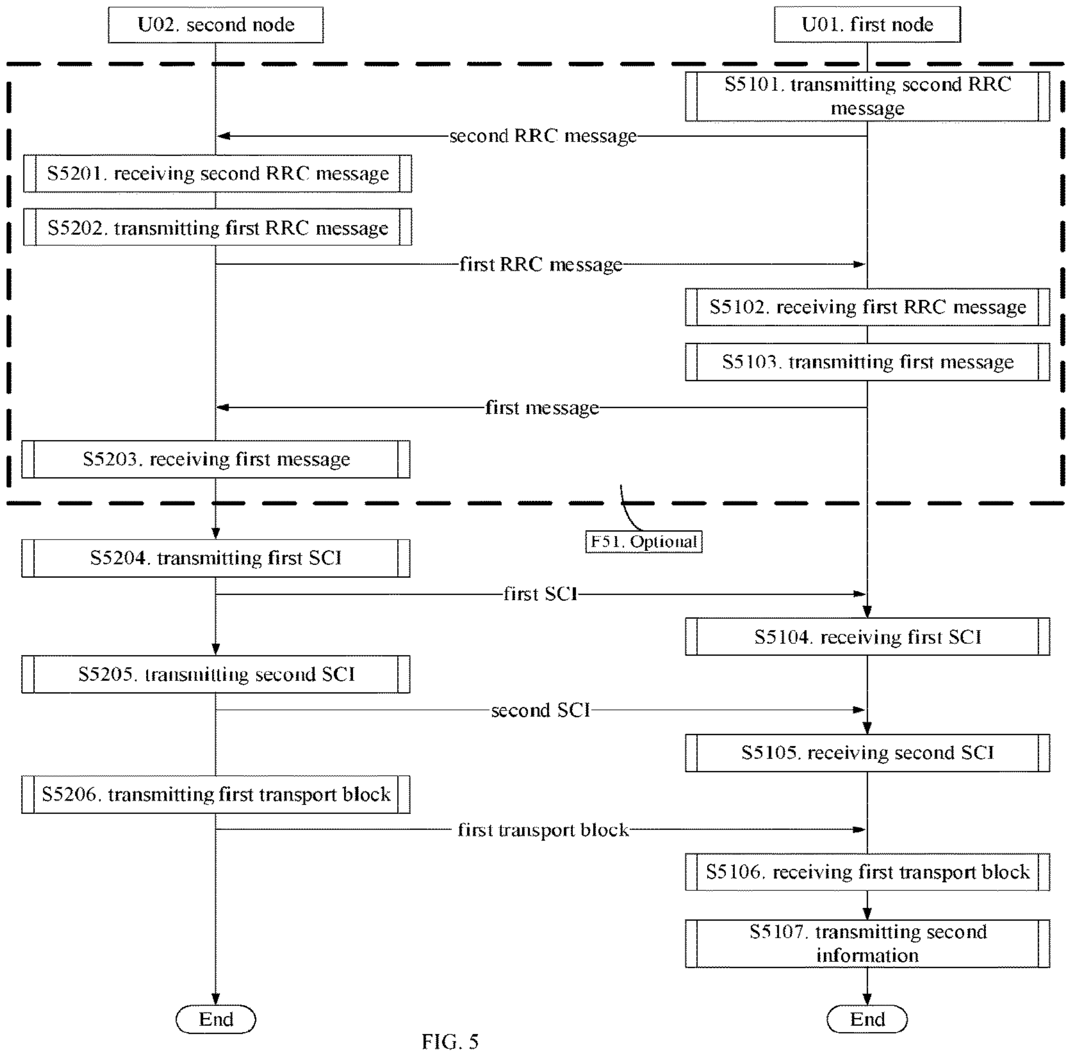
FIG. 5 illustrates a flowchart of radio signal transmission according to one embodiment of the present application.

Embodiment 5 illustrates a flowchart of radio signal transmission according to one embodiment in the present application, as shown in FIG. 5. In FIG. 5, U01 corresponds to a first node in the present application, U02 corresponds to a second node in the present application. It is particularly underlined that the order illustrated in the embodiment does not put constraints over sequences of signal transmissions and implementations and steps in F51 and the step S5107 are optional.

The first node U01 transmits a second message in step S5101; receives a first RRC message in step S5102; transmits a first message in step S5103; receives a first SCI in step S5104; receives a second SCI in step S5105; receives a first TB in step S5106; transmits a second message in step S5107;

The second node U02 receives a second RRC message in step S5201; transmits a first RRC message in step S5202; receives a first message in step S5203; transmits first SCI in step S5204; transmits a second SCI in step S5205; transmits a first TB in step S5206.

In embodiment 5, the first SCI, the second SCI and the first TB are transmitted on sidelink;

herein, the first SCI schedules a first PSSCH; both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, both the first node U01 and the second node U02 are UEs.

In one embodiment, a link between the first node U01 and the second node U02 is sidelink.

In one embodiment, a direct link is established between the first node U01 and the second node U02.

In one embodiment, a PC5 RRC connection is established between the first node U01 and the second node U02.

In one embodiment, an air interface between the first node U01 and the second node U02 is a PC5 interface.

In one embodiment, the first node U01 is a relay UE of the second node U02.

In one embodiment, the second node U02 is a relay UE of the first node U01.

In one embodiment, the first node U01 is a cluster head of the second node U02.

In one embodiment, the second node U02 is a cluster head of the first node U01.

In one embodiment, the second RRC message is an RRC message of a PC5 interface.

In one embodiment, the second RRC message is an RRC message on sidelink.

In one embodiment, the second RRC message is used to indicate a size of the first SCI format comprised in the first format subset.

In one embodiment, the second RRC message comprises a size of a format of the first SCI of the first format subset.

In one embodiment, the second RRC message comprises a size of all SCI formats comprised in the first format subset.

In one embodiment, sizes of all SCI formats comprised in the first format subset are the same.

In one embodiment, the first format subset comprises M SCI formats, and sizes of the M SCI formats have N types.

In one subembodiment of the embodiment, N is less than M.

In one subembodiment of the above embodiment, M is a positive integral multiple of N, M being greater than N.

In one subembodiment of the above embodiment, N is equal to 2.

In one subembodiment of the above embodiment, the meaning of the phrase that sizes of the M SCI formats have N types is: a size of any of the M SCI formats belongs to a first size set, and the first size set comprises N values.

In one embodiment, the first node U01 determines a size of an SCI format in the first format subset based on at least a number of subband(s).

In one embodiment, the first node U01 determines a size of an SCI format in the first format subset based on at least antenna configuration.

In one embodiment, the first node U01 determines a size of an SCI format in the first format subset based on at least TCI.

In one embodiment, the first node U01 determines a size of an SCI format in the first format subset based on at least bandwidth.

In one embodiment, the first node U01 determines a size of an SCI format in the first format subset based on at least resource pool.

In one embodiment, the first node U01 determines a size of an SCI format in the first format subset based on at least one spatial parameter.

In one embodiment, the first node U01 determines a size of an SCI format in the first format subset based on at least M.

In one embodiment, a size of an SCI format in the first format subset is configurable.

In one embodiment, a size of at least the first SCI format in the first format subset is configurable.

In one embodiment, the second RRC message is used to trigger the first RRC message.

In one embodiment, the first RRC message is a confirmation or feedback of the second RRC message.

In one embodiment, names of the first RRC message and the second RRC message are the same.

In one embodiment, the first RRC message and the second RRC message do not exist at the same.

In one embodiment, the first RRC message is an RRC message of a PC5 interface.

In one embodiment, the first RRC message is an RRC message on sidelink.

In one embodiment, the first RRC message is used to indicate a size of the first SCI format comprised in the first format subset.

In one embodiment, the first RRC message comprises a size of a format of the first SCI of the first format subset.

In one embodiment, the first RRC message comprises a size of all SCI formats comprised in the first format subset.

In one embodiment, the second node U02 determines a size of an SCI format in the first format subset based on at least a number of subband(s).

In one embodiment, the second node U02 determines a size of an SCI format in the first format subset based on at least antenna configuration.

In one embodiment, the second node U02 determines a size of an SCI format in the first format subset based on at least TCI.

In one embodiment, the second node U02 determines a size of an SCI format in the first format subset based on at least bandwidth.

In one embodiment, the second node U02 determines a size of an SCI format in the first format subset based on at least resource pool.

In one embodiment, the second node U02 determines a size of an SCI format in the first format subset based on at least one spatial parameter.

In one embodiment, the second node U02 determines a size of an SCI format in the first format subset based on at least M.

In one embodiment, sizes of the SCI format 2-A, the SCI format 2-B, the SCI format 2-C are not configurable.

In one embodiment, sizes of the SCI format 2-A, the SCI format 2-B, the SCI format 2-C are fixed.

In one embodiment, the second RRC message is used to confirm the first RRC message, and the step S5101 is later than the step S5102.

In one embodiment, the step S5202 is earlier than the step S5204.

In one embodiment, the step S5204 is earlier than the step S5205 and the step S5206.

In one embodiment, the step S5101 is earlier than the step S5104.

In one embodiment, the first message is MAC-layer control information.

In one embodiment, the first message is an SCI.

In one embodiment, the first message is used to trigger the first SCI.

In one embodiment, the first message is used to trigger the second SCI.

In one embodiment, the first message is used to trigger the first TB.

In one embodiment, the first message is used to request positioning information.

In one embodiment, before the first message, the first node U01 and the second node U02 configure the first message through an RRC message of a PC5 interface.

In one subembodiment of the above embodiment, the phrase of configuring the first message comprises configuring at least one parameter comprised in the first message.

In one subembodiment of the above embodiment, the phrase of configuring the first message comprises configuring resources occupied by the first message.

In one subembodiment of the above embodiment, the phrase of configuring the first message comprises configuring a transmission time of the first message.

In one subembodiment of the above embodiment, the phrase of configuring the first message comprises configuring a resource pool occupied by the first message.

In one embodiment, before the first message, the first node U01 and the second node U02 configure a sidelink DRX through an RRC message of a PC5 interface.

In one subembodiment of the above embodiment, the sidelink DRX is for the second node U02.

In one subembodiment of the above embodiment, the sidelink DRX is for a communication pair of the first node U01 and the second node U02.

In one embodiment, before the first message, the first node U01 and the second node U02 configure a time interval between the first TB and the first message through an RRC message of a PC5 interface.

In one embodiment, before the first message, the first node U01 and the second node U02 configure a maximum time interval between the first TB and the first message through an RRC message of a PC5 interface.

In one embodiment, before the first message, the first node U01 and the second node U02 configure the first TB through an RRC message of a PC5 interface.

In one subembodiment of the above embodiment, the phrase of configuring the first TB comprises configuring a type of the first TB.

In one subembodiment of the above embodiment, the phrase of configuring the first TB comprises configuring a used resource pool.

In one subembodiment of the above embodiment, the phrase of configuring the first TB comprises configuring a number of transmission times.

In one subembodiment of the above embodiment, the phrase of configuring the first TB comprises configured power.

In one subembodiment of the above embodiment, the phrase of configuring the first TB comprises configuring a Layer-2 ID comprised in the second SCI.

In one embodiment, the second node U02 starts a first timer after receiving the first message, and a transmission of the first TB is not later than an expiration of the first timer.

In one subembodiment of the above embodiment, the first timer is configured by a PC5-RRC message.

In one subembodiment of the above embodiment, the first timer is configured by a PC5-RRC message.

In one subembodiment of the above embodiment, the first node U01 and the second node U02 configure the first timer through the RRC message of a PC5 interface.

In one embodiment, the first TB is transmitted accompanying the first SCI.

In one embodiment, the first TB is transmitted accompanying the second SCI.

In one embodiment, the direct link is a communication link of direct communication between a UE and a UE.

In one subembodiment of the above embodiment, the link needs to be established to be used, and establishing a direct link involves a PC5-S message.

In one embodiment, the first node U01 transmits a first discovery message, and the first discovery message is used for a discovery on direct link; the first discovery message comprises a first identity of the first node U01, and the first identity is a Layer-2 ID; a source identity indicated by a MAC sub-header of a MAC PDU comprising the first message is different from the first identity.

In one embodiment, a source identity field of the second SCI comprises 8 least significant bits of a layer-2 ID of the second node U02.

In one embodiment, a destination identity field of the second SCI comprises 16 least significant bits of a layer-2 ID of the first node.

In one embodiment, the second SCI indicates that the first TB comprises a PRS or an SRS.

In one embodiment, the second SCI indicates that the first TB only comprises a PRS or an SRS.

In one embodiment, the second SCI indicates a new transmission.

In one embodiment, the second SCI does not indicate a new transmission.

In one embodiment, a reception of the second SCI is used to trigger starting an inactivity timer of sidelink DRX.

In one embodiment, the first TB is a PRS.

In one embodiment, the first TB is an SRS.

In one embodiment, the first TB comprises a MAC subhead.

In one embodiment, the first TB comprises a MAC CE.

In one embodiment, the first TB does not comprise a PDU of a MAC layer.

In one embodiment, the second SCI and the first TB are multiplexed together.

In one embodiment, the second SCI and the first TB are transmitted at the same time.

In one embodiment, the second SCI and the first TB are received at the same time.

In one embodiment, the first node U01 monitors an SCI in active time of sidelink DRX.

In one embodiment, the behavior of monitoring an SCI during an active time of a sidelink DRX comprises receiving the first SCI.

In one embodiment, the behavior of monitoring an SCI during an active time of a sidelink DRX comprises receiving the second SCI.

In one embodiment, the active time of the sidelink DRX comprises a first time resource, and the first time resource depends on a transmission time of the first message.

In one embodiment, time-domain resources occupied by the first time resource are limited.

In one embodiment, time-domain resources occupied by the first time resource do not exceed a sidelink DRX period.

In one embodiment, an upper limit of time-domain resources occupied by the first time resource is configured by the first node by itself.

In one embodiment, an upper limit of time-domain resources occupied by the first time resource is configured by a primary cell of the first node.

In one embodiment, an upper limit of time-domain resources occupied by the first time resource is configured by the first RRC message.

In one embodiment, an upper limit of time-domain resources occupied by the first time resource is pre-configured.

In one embodiment, time-domain resources occupied by the first time resource do not exceed 160 slots.

In one embodiment, time-domain resources occupied by the first time resource do not exceed 32 slots.

In one embodiment, the first message indicates a maximum delay from receiving the first message to transmitting the first TB.

In one embodiment, the active time of the sidelink DRX comprises all of the first time resource.

In one embodiment, the meaning of the phrase that the first time resource depends on a transmission time of the first message comprises: the first time resource starts from a transmission of the first message.

In one embodiment, the meaning of the phrase that the first time resource depends on a transmission time of the first message comprises: the first message being transmitted is a start of the first time resource.

In one embodiment, the meaning of the phrase that the first time resource depends on a transmission time of the first message comprises: the first time resource starts from a first slot after the first message is transmitted.

In one embodiment, the meaning of the phrase that the first time resource depends on a transmission time of the first message comprises: a time offset after the first message being transmitted is a start of the first time resource.

In one subembodiment of the above embodiment, the time offset is indicated through an RRC message.

In one subembodiment of the above embodiment, the time offset is indicated through an RRC message of a PC5 interface.

In one subembodiment of the above embodiment, the time offset is related to a time-frequency resource pool used by the first PSSCH.

In one subembodiment of the above embodiment, the first message indicates the time offset.

In one embodiment, the first message indicates the first time resource.

In one embodiment, the first message indicates a start of the first time resource.

In one embodiment, the meaning of the phrase that the first time resource depends on a transmission time of the first message comprises: a time for transmitting the first message is used to determine the first time resource.

In one embodiment, the second message comprises first position information, and a measurement performed on the first position information is based on the first TB.

In one embodiment, the second message comprises first position information, and a measurement performed on the first position information is based on the first PSSCH.

In one embodiment, the first location information comprises the first time location information.

In one embodiment, the first location information comprises the first time location information and the first receive power information.

In one embodiment, the first message indicates a type of the first TB; and the type of the first signal comprises a positioning reference signal (PRS) and a sounding reference signal (SRS).

In one embodiment, the first location information comprises location information from other nodes.

In one embodiment, the first location information comprises location information from other UEs.

In one embodiment, the first location information comprises location information from the second node U02.

In one embodiment, the first location information comprises location information from other fixed nodes.

In one embodiment, the first location information comprises location information from other mobile nodes.

In one embodiment, the first location information comprises integrity of location information.

Typically, the first location information comprises at least one of first time location information or first receive power information.

In one embodiment, resolution of the first time location information is Ts, where Ts is 1/(15000*2048) s.

In one embodiment, resolution of the first time location information is 4 Ts, where Ts is 1/(15000*2048) s.

In one embodiment, resolution of the first time location information is N times Ts, where Ts is 1/( 15000*2048) s, N being a positive integer.

In one embodiment, the first receive power information is measured by dBm.

In one embodiment, the first receive power information is measured by dB.

In one embodiment, the first time position comprises Reference Signal Time Difference (RSTD).

In one embodiment, the first time location information comprises RxTxTimeDiff.

In one embodiment, the first time location information comprises Relative Time of Arrival (RTOA).

In one embodiment, the first receive power information comprises Reference Signal Received Power (RSRP) of the first TB.

In one embodiment, the first receive power information comprises Reference Signal Received Power (RSRP) of the first PSSCH.

In one embodiment, the first receive power information comprises Reference Signal Received Path Power (RSRPP) of the first PSSCH.

In one embodiment, the first location information comprises the first time location information.

In one embodiment, the first location information comprises the first time location information and the first receive power information.

In one embodiment, the second message is delivered via at least air interface.

In one embodiment, the second message is delivered through an interface between a base station and a location service center as well as uplink.

In one embodiment, the second message is transmitted via a sidelink.

In one embodiment, the second message is transmitted for a transmitter of the first SCI.

In one embodiment, the second message is transmitted to a relay of the first node U01, and is forwarded to other nodes via a relay node.

In one subembodiment of the embodiment, the other nodes are a base station or a cell or a cell group.

In one subembodiment of the embodiment, the other nodes are other UEs.

In one embodiment, the second information is transferred inside the first node U01.

In one embodiment, the behavior of transmitting a second message comprises: the lower layer of the first node U01 delivers the second message to the higher layer of the first node U01.

In one embodiment, the second message is an LPP message.

In one embodiment, a receiver of the second message is an LMF.

In one subembodiment of the above embodiment, the LMF is a functional entity within the core network.

In one embodiment, the second message is forwarded through the second node U02.

In one embodiment, a receiver of the second message is a node other than the second node U02.

In one embodiment, the second message is an internal message of the first node U01.

In one embodiment, a reception of the first SCI is not used to trigger starting an inactivity timer of sidelink DRX.

In one embodiment, a reception of the second SCI is not used to trigger starting an inactivity timer of sidelink DRX.

In one embodiment, a reception of the second SCI is used to trigger stopping an inactivity timer of sidelink DRX.

In one embodiment, the second message comprises measurement results of the first signal and a second signal.

In one embodiment, the second message comprises a timestamp for the first TB.

In one embodiment, the second message comprises a timestamp for the first PSSCH.

In one embodiment, the second message comprises a timestamp for the second SCI.

In one embodiment, the second message comprises a timestamp for the first SCI.

Embodiment 6

Figure 6:
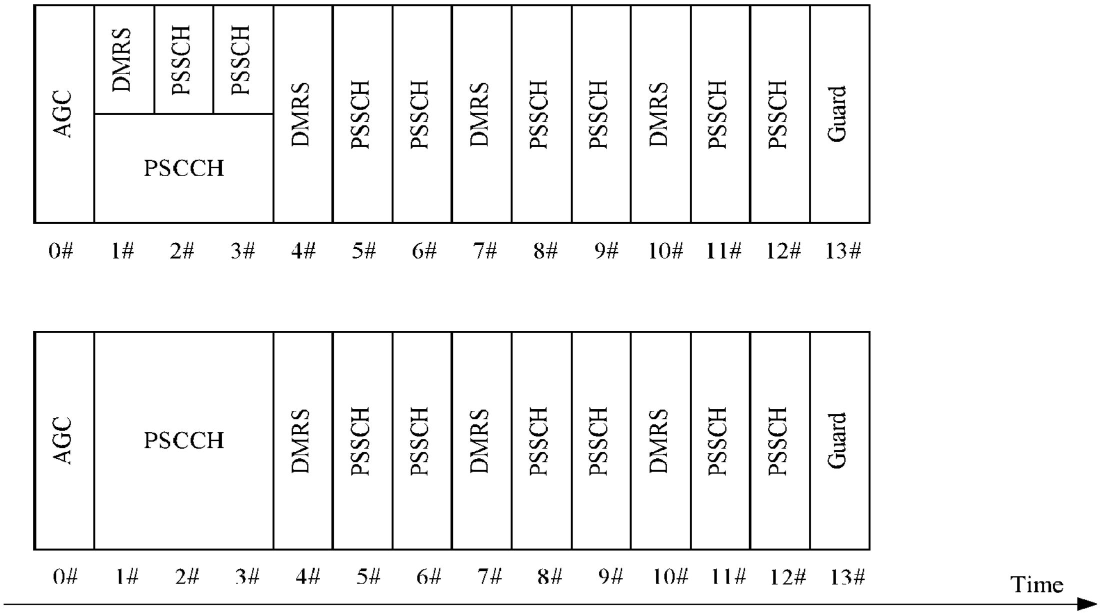
FIG. 6 illustrates a schematic diagram of sidelink transmission according to one embodiment of the present application.

Embodiment 6 illustrates a schematic diagram of sidelink transmission according to one embodiment of the present application, as shown in FIG. 6.

FIG. 6 illustrates an example of a frame structure in sidelink communications, although FIG. 6 does not illustrate all frame structures, the frame structures not shown have significant similarity to FIG. 6.

FIG. 6 illustrates two frame structures in sidelink communications, the upper frame structure in FIG. 6 is a frame structure when a PSCCH does not occupy all frequency-domain resources, while the lower frame structure in FIG. 6 is a frame structure when a PSCCH occupies all frequency-domain resources.

FIG. 6 illustrates a frame structure of a slot, for the convenience of the following description, the direction of 0 # is forward, and the direction of 13 # is backward.

In one embodiment, the all frequency-domain resources comprise one or multiple subchannels.

In one embodiment, the all frequency-domain resources comprise one or multiple subbands.

In one embodiment, the frame structure in FIG. 6 is a frame structure within a slot.

In one embodiment, the frame structure in FIG. 6 is a frame structure when a slot comprises 14 symbols.

In one embodiment, in other embodiments, a slot in sidelink communications can also comprise 13 available symbols.

In one embodiment, in sidelink communications, a PSCCH can occupy one or two symbols.

In one embodiment, an AGC symbol in FIG. 6 is used for automatic gain control.

In one embodiment, a Guard symbol in FIG. 6 is used for protection.

In one embodiment, in another embodiment, within a slot can also comprise multiple Guard symbols.

In one embodiment, a slot in FIG. 6 is 1 ms.

In one embodiment, a slot in FIG. 6 is 1 subframe.

In one embodiment, in sidelink communications, an SCI is always required when transmitting data.

In one embodiment, in sidelink communications, a PSCCH is always required when transmitting data.

In one embodiment, in sidelink communications, a PSSCH is always required when transmitting data.

In one embodiment, in a slot of sidelink communications, a DMRS is dispersed among PSSCH symbols.

In one embodiment, in another embodiment, symbols that can be used for a physical sidelink feedback channel (PSFCH) can also be comprised.

In one embodiment, in another embodiment, a slot can also comprise 2 symbols of a PSFCH.

In one embodiment, whether a PSCCH occupies all symbols is related to a size of the first SCI carried by a PSCCH.

In one embodiment, whether a PSCCH occupies all symbols is related to an occupied or available bandwidth.

In one embodiment, the first SCI is transmitted on a PSCCH in FIG. 6.

In one embodiment, the second SCI is transmitted on a PSSCH in FIG. 6.

In one embodiment, in other embodiments, a slot can comprise more symbols used to transmit a reference signal.

In one embodiment, the first TB is transmitted on a PSSCH in FIG. 6.

In one embodiment, a part of the first TB is transmitted on a PSSCH.

In one embodiment, the first RRC message configures a frame structure used by the first node.

In one embodiment, a broadcast message configures a frame structure used by the first node.

In one embodiment, a PSSCH can be multiplexed with a PSCCH into a same sub-channel.

In one embodiment, a frame structure used by the first node is predefined.

In one embodiment, in a slot used for transmitting a positioning reference signal (PRS), a PRS occupies at least part of DMRS symbols in FIG. 6.

In one embodiment, in a slot used for transmitting a positioning reference signal (PRS), a PRS occupies at least part of PSSCH symbols in FIG. 6.

In one embodiment, in a slot used for transmitting a positioning reference signal (PRS), a PRS occupies middle of PSSCH symbols in FIG. 6.

In one embodiment, in a slot used for transmitting a positioning reference signal (PRS), a PRS occupies middle of DMRS symbols in FIG. 6.

In one embodiment, in a slot used for transmitting a positioning reference signal (PRS), a PRS occupies rear of FIG. 6, that is, a PSSCH symbol close to a Guard symbol.

In one embodiment, in a slot used for transmitting a positioning reference signal (PRS), a PRS occupies rear of FIG. 6, that is, a DMRS symbol close to Guard.

In one embodiment, in a slot used for transmitting a positioning reference signal (PRS), 2 Guard symbols are comprised.

In one embodiment, in a slot used for transmitting a positioning reference signal (PRS), 2 Guard symbols are comprised, and at least one of two Guard symbols is used to transmit a PRS.

In one embodiment, in a slot used for transmitting a positioning reference signal (PRS), a PRS is located at 11 #th and 12 #th symbol.

In one embodiment, in a slot used for transmitting a positioning reference signal (PRS), a PRS is located at one of 11 #th and 12 #th symbol.

Embodiment 7

Figure 7:
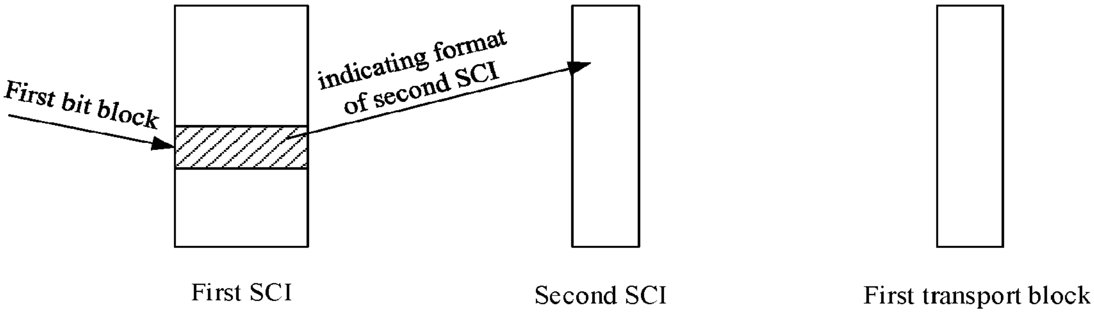
FIG. 7 illustrates a schematic diagram of a first bit group being used to indicate a format of a second SCI according to one embodiment of the present application.

Embodiment 7 illustrates a schematic diagram of a first bit group being used to indicate a format of a second SCI according to one embodiment of the present application, as shown in FIG. 7.

In FIG. 7, a first SCI, a second SCI, and a first TB are dispersed and do not limit a chronological relation among the three in transmission.

In embodiment 7, the first bit group belongs to the first SCI, and the first bit group is used to indicate the format of the second SCI.

In one embodiment, the first bit group belongs to a field of the first SCI.

In one embodiment, the first bit group belongs to at least partial bits comprised in a field in the first SCI.

In one embodiment, the first bit group belongs to at least partial bits comprised in two fields in the first SCI.

In one embodiment, the first bit group belongs to at least partial bits comprised in three fields in the first SCI.

In one embodiment, the first bit group belongs to a reserved field of the first SCI.

In one embodiment, when the second SCI adopts different formats, fields comprised in the second SCI are not completely the same.

In one embodiment, when the second SCI adopt different formats, sizes of the second SCI are different.

In one embodiment, the first bit group is K continuous bit(s) in the first SCI, K being a positive integer.

In one embodiment, K bits comprised in the first bit group are discontinuous in the first SCI, K being a positive integer greater than 1.

In one embodiment, a user who do not support the method proposed in the present application considers that the first bit group is a reserved bit.

In one embodiment, a user who do not support the method proposed in the present application interprets the first bit group as a bit related to modulation encoding.

In one embodiment, a user who do not support the method proposed in the present application interprets the first bit group as a bit related to RV.

In one embodiment, a user who do not support the method proposed in the present application interprets the first bit group as a bit related to priority.

In one embodiment, a user who do not support the method proposed in the present application interprets the first bit group as a bit related to resource allocation.

In one embodiment, a user who do not support the method proposed in the present application interprets the first bit group as a bit related to a flag/indicator.

In one embodiment, when the first bit group is used to indicate the format of the second SCI, at least one bit in bits belonging to the first SCI in the first bit group has a value of 1.

In one embodiment, when the value of the $2^{nd}$-stage SCI format field in the first SCI is one of 00, 01 and 10, the first bit group is not used to indicate a modulation coding and/or as a reserved bit.

Embodiment 8

Figure 8:
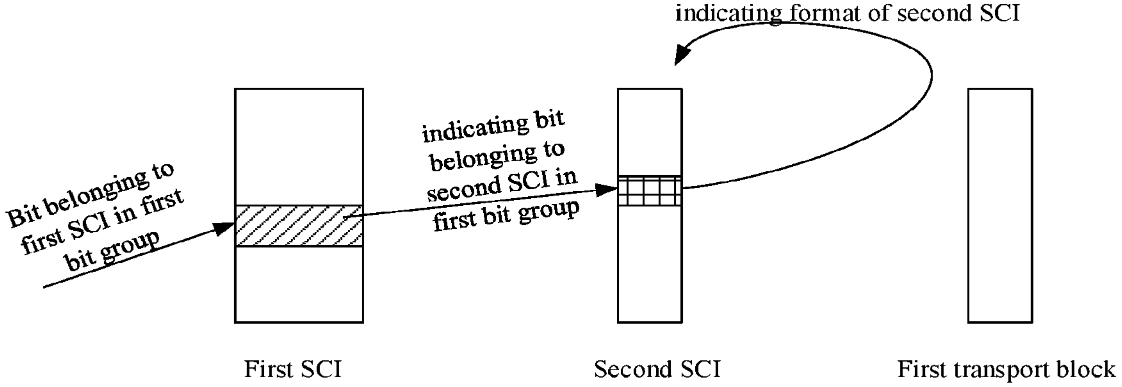
FIG. 8 illustrates a schematic diagram of a first bit group being used to indicate a format of a second SCI according to one embodiment of the present application.

Embodiment 8 illustrates a schematic diagram of a first bit group being used to indicate a format of a second SCI according to one embodiment of the present application, as shown in FIG. 8.

In FIG. 8, a first SCI, a second SCI, and a first TB are dispersed and do not limit a chronological relation among the three in transmission.

In one embodiment, at least one bit in the first bit group belong to the first SCI; at least one bit in the first bit group belongs to the second SCI.

In one embodiment, a bit in the first bit group belong to the first SCI; at least one bit in the first bit group belongs to the second SCI.

In one embodiment, a bit in the first bit group belong to the first SCI; two bits in the first bit group belong to the second SCI.

In one embodiment, a bit in the first bit group belongs to the first SCI; a bit in the first bit group belongs to the second SCI.

In one embodiment, a bit belonging to a first SCI in the first bit group is used to indicate whether the first bit group comprises a bit belonging to the second SCI.

In one embodiment, a bit belonging to a first SCI in the first bit group is used to indicate a number of bit(s) belonging to the second SCI comprised in the first bit group.

In one embodiment, a bit belonging to a first SCI in the first bit group is used to indicate a position of a bit belonging to the second SCI comprised in the first bit group.

In one embodiment, a bit belonging to a first SCI in the first bit group is used to indicate a module of a bit belonging to the second SCI comprised in the first bit group.

In one embodiment, a bit belonging to a first SCI in the first bit group is used to indicate to which field a bit belonging to the second SCI comprised in the first bit group belongs.

In one embodiment, a bit belonging to a first SCI in the first bit group is used to indicate a candidate of the format of the second SCI indicated by a bit belonging to the second SCI comprised in the first bit group.

In one embodiment, a bit belonging to a first SCI in the first bit group is used to indicate a bit belonging to a format of the first format subset comprised in the first bit group.

In one embodiment, a number of bit(s) belonging to the first SCI in the first bit group is 1.

In one embodiment, a number of bit(s) belonging to the second SCI in the first bit group is 1.

In one embodiment, a number of bit(s) belonging to the second SCI in the first bit group is 2.

In one embodiment, a number of bit(s) belonging to the second SCI in the first bit group is 3.

In one embodiment, a user who do not support the method proposed in the present application consider that a bit belonging to the first SCI in the first bit group is a reserved bit.

In one embodiment, a user who do not support the method proposed in the present application interprets a bit belonging to the first SCI in the first bit group as a bit related to modulation encoding.

In one embodiment, a user who do not support the method proposed in the present application interprets a bit belonging to the first SCI in the first bit group as a bit related to RV.

In one embodiment, a user who do not support the method proposed in the present application interprets a bit belonging to the first SCI in the first bit group as a bit related to priority.

In one embodiment, a user who do not support the method proposed in the present application interprets a bit belonging to the first SCI in the first bit group as a bit related to resource allocation.

In one embodiment, a user who do not support the method proposed in the present application interprets a bit belonging to the first SCI in the first bit group as a bit related to a flag/indicator.

In one embodiment, when the first bit group is used to indicate the format of the second SCI, a value of at least one bit in bits belonging to the first SCI in the first bit group is 1.

Embodiment 9

Figure 9:
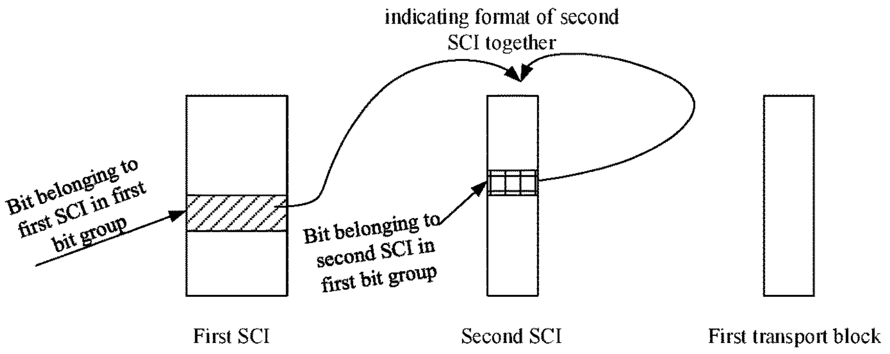
FIG. 9 illustrates a schematic diagram of a first bit group being used to indicate a format of a second SCI according to one embodiment of the present application.

Embodiment 9 illustrates a schematic diagram of a first bit group being used to indicate a format of a second SCI according to one embodiment of the present application, as shown in FIG. 9.

In FIG. 9, a first SCI, a second SCI, and a first TB are dispersed and do not limit a chronological relation among the three in transmission.

In one embodiment, a number of bit(s) belonging to the first SCI in the first bit group is 1.

In one embodiment, a number of bit(s) belonging to the second SCI in the first bit group is 1.

In one embodiment, a number of bit(s) belonging to the second SCI in the first bit group is 2.

In one embodiment, a number of bit(s) belonging to the second SCI in the first bit group is 3.

In one embodiment, a user who do not support the method proposed in the present application consider that a bit belonging to the first SCI in the first bit group is a reserved bit.

In one embodiment, a user who do not support the method proposed in the present application interprets a bit belonging to the first SCI in the first bit group as a bit related to modulation coding.

In one embodiment, a user who do not support the method proposed in the present application interprets a bit belonging to the first SCI in the first bit group as a bit related to RV.

In one embodiment, a user who do not support the method proposed in the present application interprets a bit belonging to the first SCI in the first bit group as a bit related to priority.

In one embodiment, a user who do not support the method proposed in the present application interprets a bit belonging to the first SCI in the first bit group as a bit related to resource allocation.

In one embodiment, a user who do not support the method proposed in the present application interprets a bit belonging to the first SCI in the first bit group as a bit related to a flag/indicator.

In one embodiment, a bit belonging to the first SCI in the first bit group and a bit belonging to a second SCI in the first bit group are used to indicate the format of the second SCI together.

In one embodiment, a bit belonging to the first SCI in the first bit group and a bit belonging to a second SCI in the first bit group are used as a virtual field to indicate the format of the second SCI together.

In one embodiment, the first bit group comprises 2 bits, when a value of the first bit group is 01, it indicates that the format of the second SCI is the first SCI format in the first format subset; when a value of the first bit group is 10, it indicates that the format of the second SCI is a second SCI format in the first format subset.

In one embodiment, when the first bit group is used to indicate the format of the second SCI, a value of at least one bit in bits belonging to the first SCI in the first bit group is 1.

Embodiment 10

Figure 10:
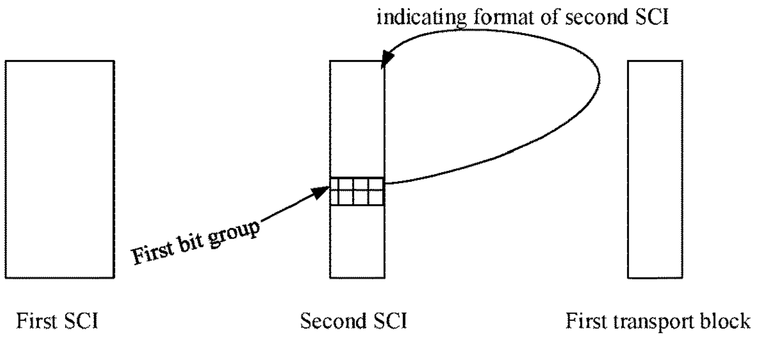
FIG. 10 illustrates a schematic diagram of a first bit group being used to indicate a format of a second SCI according to one embodiment of the present application.

Embodiment 10 illustrates a schematic diagram of a first bit group being used to indicate a format of a second SCI according to one embodiment of the present application, as shown in FIG. 10.

In FIG. 10, a first SCI, a second SCI, and a first TB are dispersed and do not limit a chronological relation among the three in transmission.

In one embodiment, all bits in the first bit group belong to the second SCI.

In one embodiment, all bits in the first bit group belong to a field in the second SCI.

In one embodiment, all bits in the first bit group belong to at least two fields in the second SCI.

In one embodiment, a size of the first bit group are 2 bits.

In one embodiment, a size of the first bit group is configurable.

In one embodiment, the first bit group comprises L bits, the first bit group occupies most significant L bits of the second SCI, where L is a positive integer.

In one embodiment, the first bit group comprises L bits, the first bit group occupies least significant L bits of the second SCI, where L is a positive integer.

In one embodiment, the first bit group is continuous in the second SCI.

In one embodiment, the first bit group is discontinuous in the second SCI.

In one embodiment, a candidate size of the second SCI is fixed, that is, the second SCI may only have one size.

In one embodiment, the first bit group is used to indicate a field comprised in the second SCI.

In one embodiment, the first bit group indicates the format of the second SCI through indicating a field comprised in the second SCI.

In one embodiment, the first bit group is used to indicate a size of the second SCI.

In one embodiment, the first bit group indicates a size of the second SCI through indicating a field comprised in the second SCI.

Embodiment 11

Figure 11:
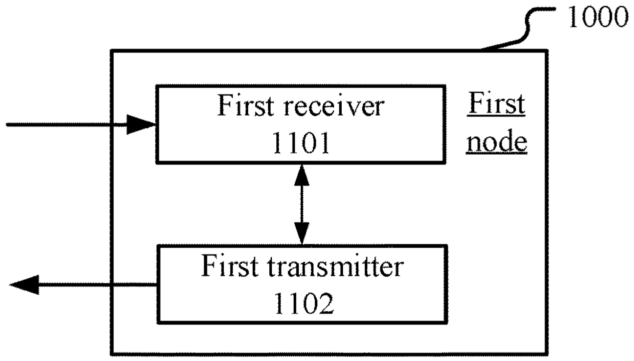
FIG. 11 illustrates a schematic diagram of a processor in a first node according to one embodiment of the present application.

Embodiment 11 illustrates a structure block diagram of a processor in a first node according to one embodiment of the present application, as shown in FIG. 11. In FIG. 11, a processor 1100 in a first node comprises a first receiver 1101 and a first transmitter 1102. In Embodiment 11, the first receiver 1101, receives a first SCI, a second SCI and a first TB on sidelink;

herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the first bit group belongs to the first SCI or the first bit group belongs to the second SCI.

In one embodiment, the first bit group belongs to the first SCI;

herein, the meaning of the phrase that the first bit group is used to indicate the format of the second SCI is: the first bit group indicates the format of the second SCI from the first format subset; the first bit group belongs to at least one of a modulation-coding-related field or reserved field of the first SCI.

In one embodiment, the first bit group belongs to the second SCI;

herein, the first format subset comprises at least two SCI formats, and numbers of bits comprised in all SCI formats in the first format subset are the same.

In one embodiment, the first bit group belongs to the second SCI;

herein, a size of the first SCI format comprised in the first format subset is the same as a size of one of the SCI format 2-A, the SCI format 2-B or the SCI format 2-C; the SCI format 2-A and the SCI format 2-B do not comprise a padding bit field.

In one embodiment, the first receiver 1101 receives a first RRC message; the first RRC message is used to indicate a size of the first SCI format comprised in the first format subset.

In one embodiment, at least partial bits in the first bit group belong to the first SCI; at least partial bits in the first bit group belong to the second SCI; the first bit group comprises at least two bits.

In one embodiment, a bit belonging to the first SCI in the first bit group is used to indicate: a bit belonging to the second SCI in the first bit group is used to indicate the format of the second SCI.

In one embodiment, a bit belonging to the first SCI in the first bit group is used to indicate a position of a bit belonging to the second SCI in the first bit group in the second SCI; a bit belonging to the second SCI in the first bit group is used to indicate the format of the second SCI.

In one embodiment, the first node is a UE.

In one embodiment, the first node is a terminal that supports large delay difference.

In one embodiment, the first node is a terminal that supports NTN.

In one embodiment, the first node is an aircraft or vessel.

In one embodiment, the first node is a mobile phone or vehicle terminal.

In one embodiment, the first node is a relay UE and/or U2N remote UE.

In one embodiment, the first node is an Internet of Things terminal or an Industrial Internet of Things terminal.

In one embodiment, the first node is a device that supports transmission with low-latency and high-reliability.

In one embodiment, the first node is a sidelink communication node.

In one embodiment, the first node is an access network.

In one embodiment, the first receiver 1101 comprises at least one of the antenna 452, the receiver 454, the receiving processor 456, the multi-antenna receiving processor 458, the controller/processor 459, the memory 460 or the data source 467 in Embodiment 4.

In one embodiment, the first transmitter 1102 comprises at least one of the antenna 452, the transmitter 454, the transmitting processor 468, the multi-antenna transmitting processor 457, the controller/processor 459, the memory 460 or the data source 467 in Embodiment 4.

Embodiment 12

Figure 12:
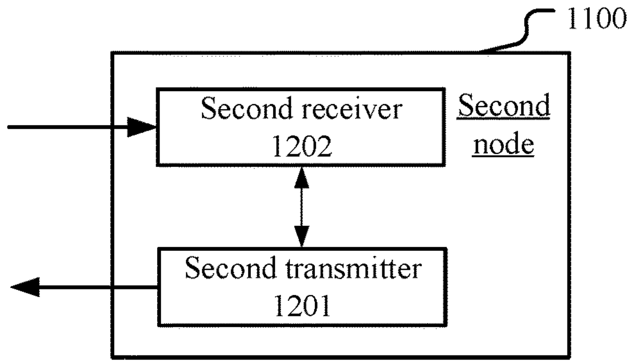
FIG. 12 illustrates a schematic diagram of a processor in a second node according to one embodiment of the present application.

Embodiment 12 illustrates a structure block diagram of a processor in a second node according to one embodiment of the present application, as shown in FIG. 12. In FIG. 12, a processor 1200 in a second node comprises a second receiver 1202 and a second transmitter 1201. In Embodiment 12, the second transmitter transmits a first SCI, a second SCI and a first TB on sidelink;

herein, the first SCI schedules a first Physical Sidelink Shared Channel (PSSCH), and both the second SCI and the first TB are transmitted in the first PSSCH; candidates of a format of the second SCI comprise SCI format 2-A, SCI format 2-B, SCI format 2-C and a first format subset; the first format subset comprises at least a first SCI format; whether a first bit group is used to indicate whether the format of the second SCI is related to a value of a $2^{nd}$-stage SCI format field in the first SCI; when the value of the $2^{nd}$-stage SCI format field in the first SCI is one of 00, 01, and 10, the first bit group is not used to indicate the format of the second SCI, and when the value of the $2^{nd}$-stage SCI format field in the first SCI is 11, the first bit group is used to indicate the format of the second SCI; the first bit group comprises at least one bit.

In one embodiment, the first bit group belongs to the first SCI or the first bit group belongs to the second SCI.

In one embodiment, the first bit group belongs to the first SCI;

herein, the meaning of the phrase that the first bit group is used to indicate the format of the second SCI is: the first bit group indicates the format of the second SCI from the first format subset; the first bit group belongs to at least one of a modulation-coding-related field or reserved field of the first SCI.

In one embodiment, the first bit group belongs to the second SCI;

herein, the first format subset comprises at least two SCI formats, and numbers of bits comprised in all SCI formats in the first format subset are the same.

In one embodiment, the first bit group belongs to the second SCI;

herein, a size of the first SCI format comprised in the first format subset is the same as a size of one of the SCI format 2-A, the SCI format 2-B or the SCI format 2-C; the SCI format 2-A and the SCI format 2-B do not comprise a padding bit field.

In one embodiment, the second transmitter 1201 transmits a first RRC message; the first RRC message is used to indicate a size of the first SCI format comprised in the first format subset.

In one embodiment, at least partial bits in the first bit group belong to the first SCI; at least partial bits in the first bit group belong to the second SCI; the first bit group comprises at least two bits.

In one embodiment, a bit belonging to the first SCI in the first bit group is used to indicate: a bit belonging to the second SCI in the first bit group is used to indicate the format of the second SCI.

In one embodiment, a bit belonging to the first SCI in the first bit group is used to indicate a position of a bit belonging to the second SCI in the first bit group in the second SCI; a bit belonging to the second SCI in the first bit group is used to indicate the format of the second SCI.

In one embodiment, the second node is a satellite.

In one embodiment, the second node is a U2N Relay UE.

In one embodiment, the second node is an IoT node.

In one embodiment, the second node is a wearable node.

In one embodiment, the second node is a relay.

In one embodiment, the second node is an access point.

In one embodiment, the second node is a node supporting multicast.

In one embodiment, the second node is a UE.

In one embodiment, the second node is a terminal.

In one embodiment, the second node is a mobile phone.

In one embodiment, the second transmitter 1201 comprises at least one of the antenna 420, the transmitter 418, the transmitting processor 416, the multi-antenna transmitting processor 471, the controller/processor 475 or the memory 476 in Embodiment 4.

In one embodiment, the second receiver 1202 comprises at least one of the antenna 420, the receiver 418, the receiving processor 470, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present application is not limited to any combination of hardware and software in specific forms. The UE and terminal in the present application include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, RFID terminals, NB-IOT terminals, Machine Type Communication (MTC) terminals, enhanced MTC (eMTC) terminals, data cards, low-cost mobile phones, low-cost tablet computers, satellite communication equipment, vessel communication equipment, NTN UEs, etc. The base station or system device in the present application includes but is not limited to macro-cellular base stations, micro-cellular base stations, home base stations, relay base station, gNB (NR node B), Transmitter Receiver Point (TRP), NTN base stations, satellite equipment, flight platform equipment and other radio communication equipment.

This application can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) configured for wireless communications, the UE comprising:

a receiver configured to receive a first sidelink control information (SCI), a second SCI and a first transport block (TB) on sidelink;

wherein the first SCI schedules a first physical sidelink shared channel (PSSCH), and both the second SCI and the first TB are transmitted in the first PSSCH;

candidates of a format of the second SCI comprise SCI format 2-A, SCI format 2-B, SCI format 2-C and a first format subset;

the first format subset comprises at least a first SCI format;

when a value of a $2^{nd}$-stage SCI format field in the first SCI is one of 00, 01, or 10, a first bit group is not used to indicate the format of the second SCI, and when the value of the $2^{nd}$-stage SCI format field in the first SCI is 11, the first bit group is used to indicate the format of the second SCI;

the first bit group comprises at least one bit.

2. The UE of claim 1, wherein the first bit group belongs to the first SCI or the first bit group belongs to the second SCI.

3. The UE of claim 1, wherein the first bit group belongs to the first SCI;

wherein a meaning of the phrase that the first bit group is used to indicate the format of the second SCI is: the first bit group indicates the format of the second SCI from the first format subset; the first bit group belongs to at least one of a modulation-coding-related field or reserved field of the first SCI.

4. The UE of claim 2, wherein the first bit group belongs to the first SCI;

wherein a meaning of the phrase that the first bit group is used to indicate the format of the second SCI is: the first bit group indicates the format of the second SCI from the first format subset; the first bit group belongs to at least one of a modulation-coding-related field or reserved field of the first SCI.

5. The UE of claim 1, wherein the first bit group belongs to the second SCI;

wherein the first format subset comprises at least two SCI formats, and numbers of bits comprised in all SCI formats in the first format subset are the same.

6. The UE of claim 2, wherein the first bit group belongs to the second SCI;

wherein the first format subset comprises at least two SCI formats, and numbers of bits comprised in all SCI formats in the first format subset are the same.

7. The UE of claim 1, wherein the first bit group belongs to the second SCI;

wherein a size of the first SCI format comprised in the first format subset is the same as a size of one of the SCI format 2-A, the SCI format 2-B or the SCI format 2-C; the SCI format 2-A and the SCI format 2-B do not comprise a padding bit field.

8. The UE of claim 2, wherein the first bit group belongs to the second SCI;

wherein a size of the first SCI format comprised in the first format subset is the same as a size of one of the SCI format 2-A, the SCI format 2-B or the SCI format 2-C; the SCI format 2-A and the SCI format 2-B do not comprise a padding bit field.

9. The UE of claim 5, wherein the first bit group belongs to the second SCI;

wherein a size of the first SCI format comprised in the first format subset is the same as a size of one of the SCI format 2-A, the SCI format 2-B or the SCI format 2-C; the SCI format 2-A and the SCI format 2-B do not comprise a padding bit field.

10. The UE of claim 6, wherein the first bit group belongs to the second SCI;

wherein a size of the first SCI format comprised in the first format subset is the same as a size of one of the SCI format 2-A, the SCI format 2-B or the SCI format 2-C; the SCI format 2-A and the SCI format 2-B do not comprise a padding bit field.

11. The UE of claim 1, wherein:

the receiver is configured to receive a first radio resource control (RRC) message; the first RRC message is used to indicate a size of the first SCI format comprised in the first format subset.

12. The UE of claim 1, wherein at least partial bits in the first bit group belong to the first SCI; at least partial bits in the first bit group belong to the second SCI; the first bit group comprises at least two bits.

13. The UE of claim 12, wherein a bit belonging to the first SCI in the first bit group is used to indicate: a bit belonging to the second SCI in the first bit group is used to indicate the format of the second SCI.

14. The UE of claim 12, wherein a bit belonging to the first SCI in the first bit group is used to indicate a position of a bit belonging to the second SCI in the first bit group in the second SCI; a bit belonging to the second SCI in the first bit group is used to indicate the format of the second SCI.

15. The UE of claim 1, wherein the first bit group depends on a reinterpretation of either the first SCI or the second SCI;

wherein a meaning of the phrase that the first bit group depends on a reinterpretation of either the first SCI or the second SCI comprises: the first bit group belongs to the first SCI, and the first bit group depends on a reinterpretation of at least one field of the first SCI; or the first bit group belongs to the second SCI, and the first bit group depends on a reinterpretation of at least one field of the second SCI.

16. The UE of claim 1, wherein the format of the second SCI belongs to the first format subset, and the second SCI is used for positioning.

17. The UE of claim 1, wherein the format of the second SCI belongs to the first format subset, and the second SCI is used for carrier aggregation.

18. The UE of claim 1, wherein the format of the second SCI belongs to the first format subset, and the second SCI is used for multi-antenna.

19. A base station configured for wireless communications, the base station comprising:

a transmitter configured to transmit a first sidelink control information (SCI), a second SCI and a first transport block (TB) on sidelink;

wherein the first SCI schedules a first physical sidelink shared channel (PSSCH), and both the second SCI and the first TB are transmitted in the first PSSCH;

candidates of a format of the second SCI comprise SCI format 2-A, SCI format 2-B, SCI format 2-C and a first format subset;

the first format subset comprises at least a first SCI format;

when a value of a $2^{nd}$-stage SCI format field in the first SCI is one of 00, 01, or 10, a first bit group is not used to indicate the format of the second SCI, and when the value of the $2^{nd}$-stage SCI format field in the first SCI is 11, the first bit group is used to indicate the format of the second SCI;

the first bit group comprises at least one bit.

20. A method for use in a user equipment (UE) configured for wireless communications, the method comprising:

receiving a first sidelink control information (SCI), a second SCI and a first transport block (TB) on sidelink;

wherein the first SCI schedules a first physical sidelink shared channel (PSSCH), and both the second SCI and the first TB are transmitted in the first PSSCH;

candidates of a format of the second SCI comprise SCI format 2-A, SCI format 2-B, SCI format 2-C and a first format subset;

the first format subset comprises at least a first SCI format;

when a value of a $2^{nd}$-stage SCI format field in the first SCI is one of 00, 01, or 10, a first bit group is not used to indicate the format of the second SCI, and when the value of the $2^{nd}$-stage SCI format field in the first SCI is 11, the first bit group is used to indicate the format of the second SCI;

the first bit group comprises at least one bit.

* * * * *